United States Patent
Kato et al.

(10) Patent No.: US 9,739,346 B2
(45) Date of Patent: Aug. 22, 2017

(54) MULTI-SPEED TRANSMISSION

(71) Applicant: AISIN AW CO., LTD., Anjo-shi, Aichi-ken (JP)

(72) Inventors: Takayoshi Kato, Handa (JP); Takashi Morimoto, Gamagori (JP); Hiroshi Kato, Kariya (JP); Minoru Todo, Takahama (JP); Satoru Kasuya, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/030,309

(22) PCT Filed: Nov. 25, 2014

(86) PCT No.: PCT/JP2014/081039
§ 371 (c)(1),
(2) Date: Apr. 18, 2016

(87) PCT Pub. No.: WO2015/080076
PCT Pub. Date: Jun. 4, 2015

(65) Prior Publication Data
US 2016/0245371 A1   Aug. 25, 2016

(30) Foreign Application Priority Data
Nov. 29, 2013   (JP) .................................. 2013-248660

(51) Int. Cl.
*F16H 3/66*   (2006.01)

(52) U.S. Cl.
CPC ..... *F16H 3/663* (2013.01); *F16H 2200/0069* (2013.01); *F16H 2200/201* (2013.01);
(Continued)

(58) Field of Classification Search
CPC ....................................................... F16H 3/663
See application file for complete search history.

(56) References Cited

U.S. PATENT DOCUMENTS

| 6,120,410 A | 9/2000 | Taniguchi et al. |
| 6,428,444 B1 | 8/2002 | Tabata |

(Continued)

FOREIGN PATENT DOCUMENTS

| JP | 2000-120813 A | 4/2000 |
| JP | 2000-220705 A | 8/2000 |

(Continued)

OTHER PUBLICATIONS

Oct. 31, 2016 European Search Report issued in European Patent Application No. 14865674.7.

(Continued)

*Primary Examiner* — Derek D Knight
(74) *Attorney, Agent, or Firm* — Oliff PLC

(57) ABSTRACT

When a fourth sun gear is held stationary so as to be unrotatable, a Ravigneaux type planetary gear mechanism transfers power, which has been transferred from an input shaft to a third carrier, to a third sun gear and a third ring gear with the speed of the power increased such that the rotational speed of the third sun gear is higher than the rotational speed of the third ring gear. A clutch, which corresponds to the third sun gear which rotates at a higher speed than that of the third ring gear, is disposed between the Ravigneaux type planetary gear mechanism and a second planetary gear disposed in proximity to the Ravigneaux type planetary gear mechanism with respect to a first planetary gear.

18 Claims, 6 Drawing Sheets

(52) U.S. Cl.
CPC ............... *F16H 2200/2023* (2013.01); *F16H 2200/2046* (2013.01)

(56) References Cited

U.S. PATENT DOCUMENTS

| | | | |
|---|---|---|---|
| 8,096,915 B2 | 1/2012 | Wittkopp et al. | |
| 8,197,375 B1* | 6/2012 | Hart | F16H 3/663 475/275 |
| 8,202,190 B2 | 6/2012 | Phillips et al. | |
| 8,425,370 B2 | 4/2013 | Leesch et al. | |
| 2006/0122025 A1* | 6/2006 | Hayabuchi | F16H 3/663 475/269 |
| 2009/0011893 A1 | 1/2009 | Kato et al. | |
| 2009/0054196 A1 | 2/2009 | Phillips et al. | |
| 2010/0210397 A1 | 8/2010 | Wittkopp et al. | |
| 2010/0216591 A1 | 8/2010 | Wittkopp et al. | |
| 2010/0331136 A1* | 12/2010 | Jang | F16H 3/663 475/275 |
| 2011/0251014 A1 | 10/2011 | Leesch et al. | |
| 2012/0088625 A1 | 4/2012 | Phillips et al. | |
| 2012/0178581 A1* | 7/2012 | Wittkopp | F16H 3/663 475/275 |
| 2013/0029799 A1* | 1/2013 | Park | F16H 3/663 475/276 |
| 2013/0053207 A1* | 2/2013 | Wilton | F16H 3/663 475/276 |
| 2015/0267787 A1 | 9/2015 | Hart | |
| 2016/0138683 A1 | 5/2016 | Kato et al. | |
| 2016/0265629 A1* | 9/2016 | Nakajima | F16H 3/663 |
| 2016/0265630 A1* | 9/2016 | Iwase | B60T 1/062 |
| 2016/0273621 A1* | 9/2016 | Jinnai | F16H 61/0265 |
| 2016/0298735 A1* | 10/2016 | Maeda | F16H 3/663 |

FOREIGN PATENT DOCUMENTS

| | | |
|---|---|---|
| JP | 2001-071792 A | 3/2001 |
| JP | 2004-353713 A | 12/2004 |
| JP | 2012-507667 A | 3/2012 |
| WO | 2015/029481 A1 | 3/2015 |

OTHER PUBLICATIONS

Mar. 3, 2015 Search Report issued in International Patent Application No. PCT/JP2014/081039.

Dec. 2, 2014 International Search Report issued in International Patent Application No. PCT/JP2014/073519.

U.S. Appl. No. 14/908,806, filed Jan. 29, 2015 in the name of Sugiura et al.

Belz, Thomas. "Varianten von Mehrgang-Planetengetrieben". pp. 1-19, 2016.

Feb. 22, 2017 Supplementary European Search Report issued in European Patent Application No. 14842944.2.

Apr. 17, 2017 Office Action issued in U.S. Appl. No. 14/908,806.

\* cited by examiner

FIG. 3

| | C1 | C2 | C3 | C4 | B1 | B2 | GEAR RATIO | STEP RATIO |
|---|---|---|---|---|---|---|---|---|
| 1st | O | O | – | – | – | O | 5.091 | 1.581 |
| 2nd | O | – | – | – | O | O | 3.219 | 1.385 |
| 3rd | – | O | – | – | O | O | 2.324 | 1.232 |
| 4th | – | – | – | O | O | O | 1.886 | 1.265 |
| 5th | – | O | – | O | O | – | 1.491 | 1.251 |
| 6th | O | – | – | O | O | – | 1.192 | 1.192 |
| 7th | O | – | O | O | – | – | 1.000 | 1.273 |
| 8th | – | – | O | O | O | – | 0.785 | 1.242 |
| 9th | O | – | O | – | O | – | 0.632 | 1.076 |
| 10th | – | O | O | – | O | – | 0.588 | 0.955 |
| REV. | – | O | O | – | – | O | -4.860 | |
| | ※"O": ENGAGED, "–": DISENGAGED | | | | | | SPREAD | 8.660 |

MULTI-SPEED TRANSMISSION

TECHNICAL FIELD

Preferred embodiments of the present disclosure relate to a multi-speed transmission that transfers power, which has been transferred from a motor of a vehicle to an input member, to an output member with the speed of the power changed.

BACKGROUND ART

There has hitherto been known a multi-speed transmission that includes two single-pinion planetary gears, a Ravigneaux type planetary gear mechanism that serves as a composite planetary gear mechanism, four clutches, and two brakes (see Patent Document 1, for example). The Ravigneaux type planetary gear mechanism which constitutes the multi-speed transmission has an input element (carrier) always coupled to an input shaft to which power from a motor is transferred, a fixable element (front sun gear) selectively held stationary by a brake such that the fixable element is unrotatable, and a first output element (ring gear) and a second output element (rear sun gear). The first output element of the Ravigneaux type planetary gear mechanism is selectively connected, via a plurality of clutches, to the sun gear or the ring gear of one (reference numeral: 20) of the two planetary gears that is disposed on the side of the rear portion of the vehicle away from the Ravigneaux type planetary gear mechanism. The second output element of the Ravigneaux type planetary gear mechanism, which rotates at a higher speed than that of the first output element when the vehicle travels forward, is selectively connected, via another clutch (reference numeral: 28), to the sun gear of the one of the planetary gears.

RELATED-ART DOCUMENTS

Patent Documents

[Patent Document 1] U.S. Pat. No. 8,096,915

SUMMARY

In the multi-speed transmission according to the related art described above, the other planetary gear is disposed between the Ravigneaux type planetary gear mechanism and the one of the planetary gears that is disposed away from the Ravigneaux type planetary gear mechanism (on the side of the rear portion of the vehicle). Thus, in order to connect the second output element of the Ravigneaux type planetary gear mechanism, which rotates at a higher speed than that of the first output element when the vehicle travels forward, to the sun gear of the one of the planetary gears, it is necessary to configure a constituent member (clutch drum) of the other clutch to bypass the other planetary gear, and to secure a sufficient strength of the constituent member. Therefore, in the multi-speed transmission according to the related art described above, the dimensions (outside diameter, axial length, and thickness), that is, the weight, of the constituent member of the other clutch may be increased, which makes it difficult to suppress an increase in size of the multi-speed transmission. Further, the inertia during rotation of the second output element and a member that rotates together with the second output element may be increased to degrade the speed change performance.

Thus, it is an object of preferred embodiments to suppress an increase in size of a multi-speed transmission that includes a clutch that connects between an output element, which rotates at a high speed, of a Ravigneaux type planetary gear mechanism and at least one of rotary elements of first and second planetary gears, and to improve the speed change performance.

Preferred embodiments provide
a multi-speed transmission that transfers power, which has been transferred from a motor of a vehicle to an input member, to an output member with a speed of the power changed, the multi-speed transmission including:
a Ravigneaux type planetary gear mechanism that has an input element, a fixable element, a first output element, and a second output element;
a first planetary gear that has a plurality of rotary elements;
a second planetary gear that has a plurality of rotary elements and that is disposed in proximity to the Ravigneaux type planetary gear mechanism with respect to the first planetary gear;
a first brake that connects the fixable element of the Ravigneaux type planetary gear mechanism to a stationary member to hold the fixable element stationary such that the fixable element is unrotatable, and that disconnects the fixable element and the stationary member from each other;
a first clutch that connects between the first output element of the Ravigneaux type planetary gear mechanism and at least one of the rotary elements of the first and second planetary gears, and that disconnects the first output element and the rotary element of the first and second planetary gears from each other; and
a second clutch that connects between the second output element of the Ravigneaux type planetary gear mechanism and at least one of the rotary elements of the first and second planetary gears, and that disconnects the second output element and the rotary element of the first and second planetary gears from each other, wherein
the Ravigneaux type planetary gear mechanism transfers the power, which has been transferred to the input element, to the first and second output elements with the speed of the power increased such that a rotational speed of the second output element is higher than a rotational speed of the first output element when the fixable element is held stationary by the first brake so as to be unrotatable; and
the second clutch is disposed between the Ravigneaux type planetary gear mechanism and the second planetary gear in an axial direction of the input member.

Thus, with the second clutch, which corresponds to the second output element of the Ravigneaux type planetary gear mechanism which rotates at a higher speed, disposed between the Ravigneaux type planetary gear mechanism and the second planetary gear which is disposed in proximity to the Ravigneaux type planetary gear mechanism, there is no need to configure the constituent members of the second clutch to bypass the planetary gears with a large diameter. Consequently, an increase in size of the multi-speed transmission can be suppressed by suppressing an increase in dimensions (such as outside diameter, axial length, and thickness), that is, weight, due to securing the strength of the constituent members of the second clutch. Further, it is possible to improve the speed change performance by reducing the inertia during rotation of the second output element, which rotates at a higher speed than that of the first output element, and members that rotate together with the second output element.

BRIEF DESCRIPTION OF THE DRAWINGS

FIG. 3 is an operation table illustrating the relationship between each shift speed of the multi-speed transmission according to a preferred embodiment and the respective operating states of clutches and brakes.

DESCRIPTION

Now, an embodiment will be described with reference to the drawings.

Figure 1:
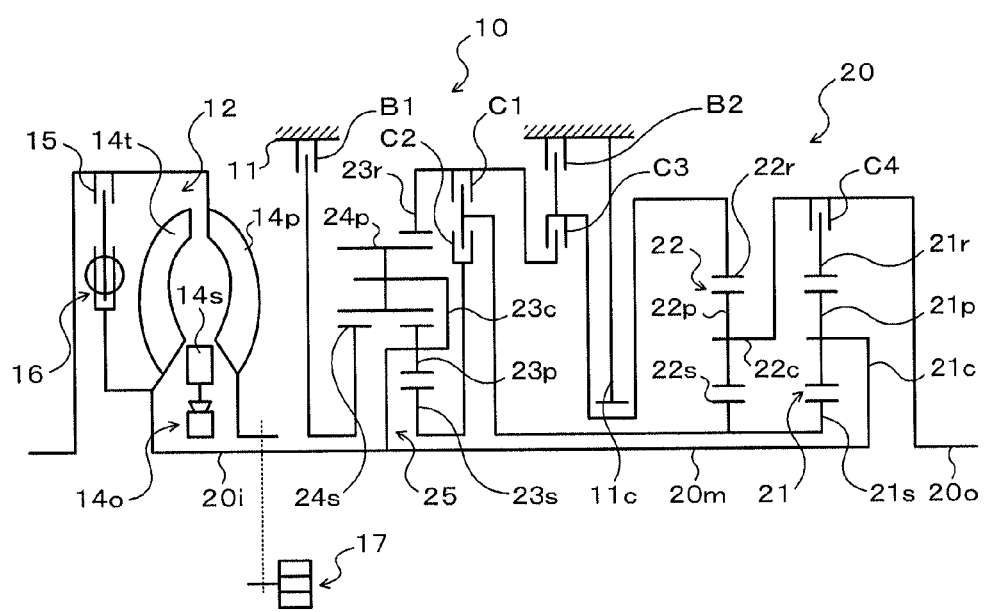
FIG. 1 illustrates a schematic configuration of a power transfer device that includes a multi-speed transmission according to a preferred embodiment.

FIG. 1 illustrates a schematic configuration of a power transfer device 10 that includes an automatic transmission 20 that serves as a multi-speed transmission according to an embodiment. The power transfer device 10 illustrated in the drawing is connected to a crankshaft of an engine (internal combustion engine; not illustrated) and/or a rotor of an electric motor that serves as a drive source vertically mounted in the front portion of a rear-drive vehicle, and can transfer power (torque) from the engine or the like to left and right rear wheels (drive wheels; not illustrated). As illustrated in the drawing, the power transfer device 10 includes a transmission case (stationary member) 11, a starting device (fluid transmission apparatus) 12, an oil pump 17, and so forth in addition to the automatic transmission 20 which transfers power, which has been transferred from the engine or the like to an input shaft 20$i$, to an output shaft 20$o$ with the speed of the power changed.

The starting device 12 includes a torque converter that has: a pump impeller 14$p$ on the input side coupled to the drive source discussed above; a turbine runner 14$t$ on the output side coupled to the input shaft (input member) 20$i$ of the automatic transmission 20; a stator 14$s$ disposed on the inner side of the pump impeller 14$p$ and the turbine runner 14$t$ to rectify a flow of working oil from the turbine runner 14$t$ to the pump impeller 14$p$; a one-way clutch 14$o$ that is supported by a stator shaft (not illustrated) and that restricts the rotational direction of the stator 14$s$ to one direction; and so forth. Further, the starting device 12 includes: a lock-up clutch 15 that connects and disconnects a front cover coupled to the crankshaft of the engine or the like and the input shaft 20$i$ of the automatic transmission 20 to and from each other; and a damper mechanism 16 that damps vibration between the front cover and the input shaft 20$i$ of the automatic transmission 20. The starting device 12 may include a fluid coupling that does not have the stator 14$s$.

The oil pump 17 is constituted as a gear pump that has: a pump assembly that includes a pump body and a pump cover; an externally toothed gear (inner rotor) coupled to the pump impeller 14$p$ of the starting device 12 via a chain or a gear train; an internally toothed gear (outer rotor) that meshes with the externally toothed gear; and so forth. The oil pump 17 is driven by power from the engine or the like to suction working oil (ATF) reserved in an oil pan (not illustrated) and pump the working oil to a hydraulic control device 60 (see FIG. 4).

The automatic transmission 20 is constituted as a 10-speed transmission. As illustrated in FIG. 1, the automatic transmission 20 includes, in addition to the input shaft 20$i$: the output shaft (output member) 20$o$ which is coupled to the left and right rear wheels via a differential gear and a drive shaft (not illustrated); a first planetary gear 21 and a second planetary gear 22 of a single pinion type disposed side by side in the axial direction of the automatic transmission 20 (the input shaft 20$i$ and the output shaft 20$o$); and a Ravigneaux type planetary gear mechanism 25 that serves as a composite planetary gear mechanism constituted by combining a double-pinion planetary gear and a single-pinion planetary gear with each other. Further, the automatic transmission 20 includes a clutch C1 (first clutch) that serves as a first engagement element, a clutch C2 (second clutch) that serves as a second engagement element, a clutch C3 (third clutch) that serves as a third engagement element, a clutch C4 (fourth clutch) that serves as a fourth engagement element, a brake B1 (first brake) that serves as a fifth engagement element, and a brake B2 (second brake) that serves as a sixth engagement element, the clutches C1 to C4 and the brakes B1 and B2 being used to change a power transfer path from the input shaft 20$i$ to the output shaft 20$o$.

In the embodiment, the first and second planetary gears 21 and 22 and the Ravigneaux type planetary gear mechanism 25 are disposed in the transmission case 11 so as to be arranged in the order of the Ravigneaux type planetary gear mechanism 25, the second planetary gear 22, and the first planetary gear 21, that is, the single-pinion planetary gear which constitutes the Ravigneaux type planetary gear mechanism 25, the double-pinion planetary gear which constitutes the Ravigneaux type planetary gear mechanism 25, the second planetary gear 22, and the first planetary gear 21 from the side of the starting device 12, that is, the side of the engine (left side in FIG. 1). Consequently, the Ravigneaux type planetary gear mechanism 25 is disposed on the side of the front portion of the vehicle in proximity to the starting device 12. In addition, the first planetary gear 21 is disposed on the side of the rear portion of the vehicle in proximity to the output shaft 20$o$. Further, the second planetary gear 22 is disposed between the Ravigneaux type planetary gear mechanism 25 and the first planetary gear 21 in the axial direction of the input shaft 20$i$, the output shaft 20$o$, and so forth.

The first planetary gear 21 has: a first sun gear 21$s$ which is an externally toothed gear; a first ring gear 21$r$ which is an internally toothed gear disposed concentrically with the first sun gear 21$s$; a plurality of first pinion gears 21$p$ that mesh with the first sun gear 21$s$ and the first ring gear 21$r$; and a first carrier 21$c$ that rotatably and revolvably holds the plurality of first pinion gears 21$p$. In the embodiment, a gear ratio $\lambda 1$ of the first planetary gear 21 (the number of teeth of the first sun gear 21$s$/the number of teeth of the first ring gear 21$r$) is determined as $\lambda 1=0.277$, for example.

As illustrated in FIG. 1, the first carrier 21$c$ of the first planetary gear 21 is always coupled (fixed) to an intermediate shaft 20$m$ of the automatic transmission 20 which is coupled to the input shaft 20$i$. Consequently, when power is transferred from the engine or the like to the input shaft 20$i$, the power from the engine or the like is always transferred to the first carrier 21$c$ via the input shaft 20$i$ and the intermediate shaft 20$m$. The first carrier 21$c$ functions as an input element of the first planetary gear 21 (a first input element of the automatic transmission 20) when the clutch C4 is engaged, and idles when the clutch C4 is disengaged. In addition, the first ring gear 21r functions as an output element of the first planetary gear 21 (a first output element of the automatic transmission 20) when the clutch C4 is engaged.

The second planetary gear 22 has: a second sun gear 22s which is an externally toothed gear; a second ring gear 22r which is an internally toothed gear disposed concentrically with the second sun gear 22s; a plurality of second pinion gears 22p that mesh with the second sun gear 22s and the second ring gear 22r; and a second carrier (planetary carrier) 22c that rotatably and revolvably holds the plurality of second pinion gears 22p. In the embodiment, a gear ratio λ2 of the second planetary gear 22 (the number of teeth of the second sun gear 22s/the number of teeth of the second ring gear 22r) is determined as λ2=0.244, for example.

As illustrated in FIG. 1, the second sun gear 22s of the second planetary gear 22 is integrated with (always coupled to) the first sun gear 21s of the first planetary gear 21, and rotated and stopped always together with (and coaxially with) the first sun gear 21s. It should be noted, however, that the first sun gear 21s and the second sun gear 22s may be constituted separately from each other and always coupled to each other via a coupling member (first coupling member; not illustrated). In addition, the second carrier 22c of the second planetary gear 22 is always coupled to the output shaft 20o, and rotated and stopped always together with (and coaxially with) the output shaft 20o. Consequently, the second carrier 22c functions as an output element of the second planetary gear 22 (a second output element of the automatic transmission 20). Further, the second ring gear 22r of the second planetary gear 22 functions as a fixable element of the second planetary gear 22 (a first fixable element of the automatic transmission 20).

The Ravigneaux type planetary gear mechanism 25 has: a third sun gear 23s and a fourth sun gear 24s which are each an externally toothed gear; a third ring gear 23r which is an internally toothed gear disposed concentrically with the third sun gear 23s; a plurality of third pinion gears (short pinion gears) 23p that mesh with the third sun gear 23s; a plurality of fourth pinion gears (long pinion gears) 24p that mesh with the fourth sun gear 24s and the plurality of third pinion gears 23p and mesh with the third ring gear 23r; and a third carrier 23c that rotatably and revolvably holds the plurality of third pinion gears 23p and the plurality of fourth pinion gears 24p.

The Ravigneaux type planetary gear mechanism 25 is a composite planetary gear mechanism constituted by combining a double-pinion planetary gear (third planetary gear) and a single-pinion planetary gear (fourth planetary gear) with each other. That is, the third sun gear 23s, the third carrier 23c, the third and fourth pinion gears 23p and 24p, and the third ring gear 23r of the Ravigneaux type planetary gear mechanism 25 constitute a double-pinion third planetary gear. In addition, the fourth sun gear 24s, the third carrier 23c, the fourth pinion gears 24p, and the third ring gear 23r of the Ravigneaux type planetary gear mechanism 25 constitute a single-pinion fourth planetary gear. In the embodiment, the Ravigneaux type planetary gear mechanism 25 is configured such that a gear ratio λ3 of the double-pinion third planetary gear (the number of teeth of the third sun gear 23s/the number of teeth of the third ring gear 23r) is determined as λ3=0.488, for example, and a gear ratio λ4 of the single-pinion fourth planetary gear (the number of teeth of the fourth sun gear 24s/the number of teeth of the third ring gear 23r) is determined as λ4=0.581, for example.

In addition, among the rotary elements which constitute the Ravigneaux type planetary gear mechanism 25 (third and fourth planetary gears), the fourth sun gear 24s functions as a fixable element of the Ravigneaux type planetary gear mechanism 25 (a second fixable element of the automatic transmission 20). Further, as illustrated in FIG. 1, the third carrier 23c is always coupled (fixed) to the input shaft 20i, and always coupled to the first carrier 21c of the first planetary gear 21 via the intermediate shaft 20m which serves as a coupling member (second coupling member). Consequently, when power is transferred from the engine or the like to the input shaft 20i, the power from the engine or the like is always transferred to the third carrier 23c via the input shaft 20i. Thus, the third carrier 23c functions as an input element of the Ravigneaux type planetary gear mechanism 25 (a second input element of the automatic transmission 20). In addition, the third ring gear 23r functions as a first output element of the Ravigneaux type planetary gear mechanism 25, and the third sun gear 23s functions as a second output element of the Ravigneaux type planetary gear mechanism 25.

The clutch C1 connects and disconnects the first sun gear 21s of the first planetary gear 21 and the second sun gear 22s of the second planetary gear 22, which are always coupled to each other, and the third ring gear 23r, which is the first output element of the Ravigneaux type planetary gear mechanism 25, to and from each other. The clutch C2 connects and disconnects the first sun gear 21s of the first planetary gear 21 and the second sun gear 22s of the second planetary gear 22, which are always coupled to each other, and the third sun gear 23s, which is the second output element of the Ravigneaux type planetary gear mechanism 25, to and from each other. The clutch C3 connects and disconnects the second ring gear 22r of the second planetary gear 22 and the third ring gear 23r, which is the first output element of the Ravigneaux type planetary gear mechanism 25, to and from each other. The clutch C4 connects and disconnects the first ring gear 21r, which is the output element of the first planetary gear 21, and the output shaft 20o to and from each other.

The brake B1 holds (connects) the fourth sun gear 24s, which is a fixable element of the Ravigneaux type planetary gear mechanism 25, stationary to the transmission case 11, which is a stationary member, such that the fourth sun gear 24s is unrotatable, and disconnects the fourth sun gear 24s from the transmission case 11 such that the fourth sun gear 24s is rotatable. The brake B2 holds (connects) the second ring gear 22r, which is a fixable element of the second planetary gear 22, stationary to the transmission case 11 such that the second ring gear 22r is unrotatable, and disconnects the second ring gear 22r from the transmission case 11, which is a stationary member, such that the second ring gear 22r is rotatable.

In the embodiment, a multi-plate friction-type hydraulic clutch (friction engagement element) is adopted as the clutches C1 to C4. The multi-plate friction-type hydraulic clutch has a piston, a plurality of friction engagement plates (e.g. a friction plate constituted by affixing a friction material to both surfaces of an annular member, and a separator plate which is an annular member with both surfaces formed to be smooth), and a hydraulic servo constituted of an engagement oil chamber, a centrifugal hydraulic pressure cancellation chamber, etc. to which working oil is supplied. Meanwhile, a multi-plate friction-type hydraulic brake is adopted as the brakes B1 and B2. The multi-plate friction-type hydraulic brake has a piston, a plurality of friction engagement plates (a friction plate and a separator plate), and a hydraulic servo constituted of an engagement oil chamber etc. to which working oil is supplied. The clutches C1 to C4 and the brakes B1 and B2 operate with working oil supplied thereto and discharged therefrom by the hydraulic control device 60.

Figure 2:
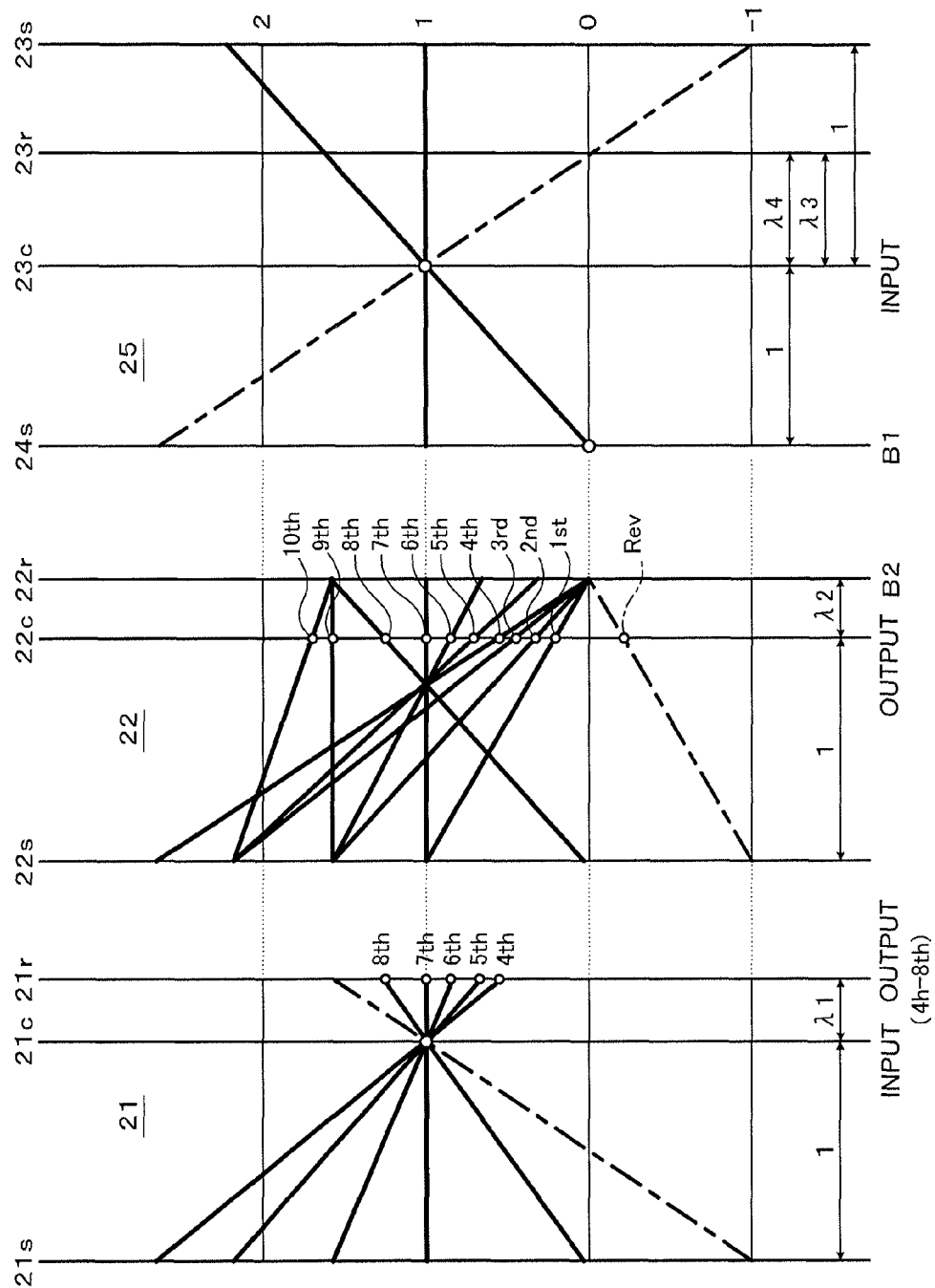
FIG. 2 is a velocity diagram illustrating the ratio of the rotational speed of each rotary element to an input rotational speed of the multi-speed transmission according to a preferred embodiment.

FIG. 2 is a velocity diagram illustrating the ratio of the rotational speed of each rotary element to the rotational speed of the input shaft 20$i$ (input rotational speed) of the automatic transmission 20 (note that the rotational speed of the input shaft 20$i$, that is, the first carrier 21$c$ and the third carrier 23$c$, is defined as a value of 1). In addition, FIG. 3 is an operation table illustrating the relationship between each shift speed of the automatic transmission 20 and the respective operating states of the clutches C1 to C4 and the brakes B1 and B2.

As illustrated in FIG. 2, the three rotary elements which constitute the single-pinion first planetary gear 21, that is, the first sun gear 21$s$, the first ring gear 21$r$, and the first carrier 21$c$, are arranged, on the velocity diagram for the first planetary gear 21 (the velocity diagram on the left side in FIG. 2), in the order of the first sun gear 21$s$, the first carrier 21$c$, and the first ring gear 21$r$ from the left side of the drawing at intervals that match the gear ratio $\lambda$1. In preferred embodiments, according to the order of arrangement on the velocity diagram, the first sun gear 21$s$ is defined as the first rotary element of the automatic transmission 20, the first carrier 21$c$ is defined as the second rotary element of the automatic transmission 20, and the first ring gear 21$r$ is defined as the third rotary element of the automatic transmission 20. Thus, the first planetary gear 21 has the first rotary element, the second rotary element, and the third rotary element of the automatic transmission 20 which are arranged sequentially at intervals that match the gear ratio $\lambda$1 on the velocity diagram.

In addition, the three rotary elements which constitute the single-pinion second planetary gear 22, that is, the second sun gear 22$s$, the second ring gear 22$r$, and the second carrier 22$c$, are arranged, on the velocity diagram for the second planetary gear 22 (the velocity diagram at the middle in FIG. 2), in the order of the second sun gear 22$s$, the second carrier 22$c$, and the second ring gear 22$r$ from the left side of the drawing at intervals that match the gear ratio $\lambda$2. In preferred embodiments, according to the order of arrangement on the velocity diagram, the second sun gear 22$s$ is defined as the fourth rotary element of the automatic transmission 20, the second carrier 22$c$ is defined as the fifth rotary element of the automatic transmission 20, and the second ring gear 22$r$ is defined as the sixth rotary element of the automatic transmission 20. Thus, the second planetary gear 22 has the fourth rotary element, the fifth rotary element, and the sixth rotary element of the automatic transmission 20 which are arranged sequentially at intervals that match the gear ratio $\lambda$2 on the velocity diagram.

Further, the four rotary elements which constitute the Ravigneaux type planetary gear mechanism 25, that is, the fourth sun gear 24$s$ which serves as a fixable element, the third carrier 23$c$ which serves as the input element, the third ring gear 23$r$ which serves as the first output element, and the third sun gear 23$s$ which serves as the second output element, are arranged, on the velocity diagram for the Ravigneaux type planetary gear mechanism 25 (the velocity diagram on the right side in FIG. 2), in the order of the fourth sun gear 24$s$, the third carrier 23$c$, the third ring gear 23$r$, and the third sun gear 23$s$ from the left side of the drawing at intervals that match the gear ratio $\lambda$3 of the single-pinion third planetary gear and the gear ratio $\lambda$4 of the double-pinion fourth planetary gear. In preferred embodiments, according to the order of arrangement on the velocity diagram, the fourth sun gear 24$s$ is defined as the seventh rotary element of the automatic transmission 20, the third carrier 23$c$ is defined as the eighth rotary element of the automatic transmission 20, and the third ring gear 23$r$ is defined as the ninth rotary element of the automatic transmission 20, and the third sun gear 23$s$ is defined as the tenth rotary element of the automatic transmission 20. Thus, the Ravigneaux type planetary gear mechanism 25 has the seventh rotary element, the eighth rotary element, the ninth rotary element, and the tenth rotary element of the automatic transmission 20 which are arranged sequentially at intervals that match the gear ratios $\lambda$3 and $\lambda$4 on the velocity diagram.

In the automatic transmission 20, the clutches C1 to C4 and the brakes B1 and B2 are engaged and disengaged as illustrated in FIG. 3 to change the relationship of connection of the first to tenth rotary elements discussed above (note that the first rotary element and the fourth rotary element are always coupled to each other, and thus substantially a total of nine rotary elements), which makes it possible to provide ten power transfer paths in the forward rotational direction and one power transfer path in the reverse rotational direction from the input shaft 20$i$ to the output shaft 20$o$, that is, first to tenth forward speeds and a reverse speed.

Specifically, the first forward speed is established by engaging the clutches C1 and C2 and the brake B2 and disengaging the remaining clutches C3 and C4 and brake B1. That is, to establish the first forward speed, the first sun gear 21$s$ of the first planetary gear 21 and the second sun gear 22$s$ of the second planetary gear 22 and the third ring gear 23$r$ (first output element) of the Ravigneaux type planetary gear mechanism 25 are connected to each other by the clutch C1. In addition, the first sun gear 21$s$ of the first planetary gear 21 and the second sun gear 22$s$ of the second planetary gear 22 and the third sun gear 23$s$ (second output element) of the Ravigneaux type planetary gear mechanism 25 are connected to each other by the clutch C2. Further, the second ring gear 22$r$ (fixable element) of the second planetary gear 22 is held stationary to the transmission case 11 by the brake B2 so as to be unrotatable. In the embodiment (in the case where the gear ratios of the first and second planetary gears 21 and 22 and the third and fourth planetary gears are determined as $\lambda$1=0.277, $\lambda$2=0.244, $\lambda$3=0.488, and $\lambda$4=0.581; the same applies hereinafter), a gear ratio $\gamma$1 of the first forward speed (the rotational speed of the input shaft 20$i$/the rotational speed of the output shaft 20$o$) is determined as $\gamma$1=5.091.

The second forward speed is established by engaging the clutch C1 and the brakes B1 and B2 and disengaging the remaining clutches C2, C3, and C4. That is, to establish the second forward speed, the first sun gear 21$s$ of the first planetary gear 21 and the second sun gear 22$s$ of the second planetary gear 22 and the third ring gear 23$r$ (first output element) of the Ravigneaux type planetary gear mechanism 25 are connected to each other by the clutch C1. In addition, the fourth sun gear 24$s$ (fixable element) of the Ravigneaux type planetary gear mechanism 25 is held stationary to the transmission case 11 by the brake B1 so as to be unrotatable. Further, the second ring gear 22$r$ (fixable element) of the second planetary gear 22 is held stationary to the transmission case 11 by the brake B2 so as to be unrotatable. In the embodiment, a gear ratio $\gamma$2 of the second forward speed is determined as $\gamma$2=3.219. In addition, the step ratio between the first forward speed and the second forward speed is determined as $\gamma$1/$\gamma$2=1.581.

The third forward speed is established by engaging the clutch C2 and the brakes B1 and B2 and disengaging the remaining clutches C1, C3, and C4. That is, to establish the third forward speed, the first sun gear 21s of the first planetary gear 21 and the second sun gear 22s of the second planetary gear 22 and the third sun gear 23s (second output element) of the Ravigneaux type planetary gear mechanism 25 are connected to each other by the clutch C2. In addition, the fourth sun gear 24s (fixable element) of the Ravigneaux type planetary gear mechanism 25 is held stationary to the transmission case 11 by the brake B1 so as to be unrotatable. Further, the second ring gear 22r (fixable element) of the second planetary gear 22 is held stationary to the transmission case 11 by the brake B2 so as to be unrotatable. In the embodiment, a gear ratio $\gamma 3$ of the third forward speed is determined as $\gamma 3 = 2.324$. In addition, the step ratio between the second forward speed and the third forward speed is determined as $\gamma 2/\gamma 3 = 1.385$.

The fourth forward speed is established by engaging the clutch C4 and the brakes B1 and B2 and disengaging the remaining clutches C1, C2, and C3. That is, to establish the fourth forward speed, the first ring gear 21r (output element) of the first planetary gear 21 and the output shaft 20o are connected to each other by the clutch C4. In addition, the fourth sun gear 24s (fixable element) of the Ravigneaux type planetary gear mechanism 25 is held stationary to the transmission case 11 by the brake B1 so as to be unrotatable. Further, the second ring gear 22r (fixable element) of the second planetary gear 22 is held stationary to the transmission case 11 by the brake B2 so as to be unrotatable. In the embodiment, a gear ratio $\gamma 4$ of the fourth forward speed is determined as $\gamma 4 = 1.886$. In addition, the step ratio between the third forward speed and the fourth forward speed is determined as $\gamma 3/\gamma 4 = 1.232$.

The fifth forward speed is established by engaging the clutches C2 and C4 and the brake B1 and disengaging the remaining clutches C1 and C3 and brake B2. That is, to establish the fifth forward speed, the first sun gear 21s of the first planetary gear 21 and the second sun gear 22s of the second planetary gear 22 and the third sun gear 23s (second output element) of the Ravigneaux type planetary gear mechanism 25 are connected to each other by the clutch C2. In addition, the first ring gear 21r (output element) of the first planetary gear 21 and the output shaft 20o are connected to each other by the clutch C4. Further, the fourth sun gear 24s (fixable element) of the Ravigneaux type planetary gear mechanism 25 is held stationary to the transmission case 11 by the brake B1 so as to be unrotatable. In the embodiment, a gear ratio $\gamma 5$ of the fifth forward speed is determined as $\gamma 5 = 1.491$. In addition, the step ratio between the fourth forward speed and the fifth forward speed is determined as $\gamma 4/\gamma 5 = 1.265$.

The sixth forward speed is established by engaging the clutches C1 and C4 and the brake B1 and disengaging the remaining clutches C2 and C3 and brake B2. That is, to establish the sixth forward speed, the first sun gear 21s of the first planetary gear 21 and the second sun gear 22s of the second planetary gear 22 and the third ring gear 23r (first output element) of the Ravigneaux type planetary gear mechanism 25 are connected to each other by the clutch C1. In addition, the first ring gear 21r (output element) of the first planetary gear 21 and the output shaft 20o are connected to each other by the clutch C4. Further, the fourth sun gear 24s (fixable element) of the Ravigneaux type planetary gear mechanism 25 is held stationary to the transmission case 11 by the brake B1 so as to be unrotatable. In the embodiment, a gear ratio $\gamma 6$ of the sixth forward speed is determined as $\gamma 6 = 1.192$. In addition, the step ratio between the fifth forward speed and the sixth forward speed is determined as $\gamma 5/\gamma 6 = 1.251$.

The seventh forward speed is established by engaging the clutches C1, C3, and C4 and disengaging the remaining clutch C2 and brakes B1 and B2. That is, to establish the seventh forward speed, the first sun gear 21s of the first planetary gear 21 and the second sun gear 22s of the second planetary gear 22 and the third ring gear 23r (first output element) of the Ravigneaux type planetary gear mechanism 25 are connected to each other by the clutch C1. In addition, the second ring gear 22r of the second planetary gear 22 and the third ring gear 23r (first output element) of the Ravigneaux type planetary gear mechanism 25 are connected to each other by the clutch C3. Further, the first ring gear 21r (output element) of the first planetary gear 21 and the output shaft 20o are connected to each other by the clutch C4. In the embodiment, a gear ratio $\gamma 7$ of the seventh forward speed is determined as $\gamma 7 = 1.000$. In addition, the step ratio between the sixth forward speed and the seventh forward speed is determined as $\gamma 6/\gamma 7 = 1.192$.

The eighth forward speed is established by engaging the clutches C3 and C4 and the brake B1 and disengaging the remaining clutches C1 and C2 and brake B2. That is, to establish the eighth forward speed, the second ring gear 22r of the second planetary gear 22 and the third ring gear 23r (first output element) of the Ravigneaux type planetary gear mechanism 25 are connected to each other by the clutch C3. In addition, the first ring gear 21r (output element) of the first planetary gear 21 and the output shaft 20o are connected to each other by the clutch C4. Further, the fourth sun gear 24s (fixable element) of the Ravigneaux type planetary gear mechanism 25 is held stationary to the transmission case 11 by the brake B1 so as to be unrotatable. In the embodiment, a gear ratio $\gamma 8$ of the eighth forward speed is determined as $\gamma 8 = 0.785$. In addition, the step ratio between the seventh forward speed and the eighth forward speed is determined as $\gamma 7/\gamma 8 = 1.273$.

The ninth forward speed is established by engaging the clutches C1 and C3 and the brake B1 and disengaging the remaining clutches C2 and C4 and brake B2. That is, to establish the ninth forward speed, the first sun gear 21s of the first planetary gear 21 and the second sun gear 22s of the second planetary gear 22 and the third ring gear 23r (first output element) of the Ravigneaux type planetary gear mechanism 25 are connected to each other by the clutch C1. In addition, the second ring gear 22r of the second planetary gear 22 and the third ring gear 23r (first output element) of the Ravigneaux type planetary gear mechanism 25 are connected to each other by the clutch C3. Further, the fourth sun gear 24s (fixable element) of the Ravigneaux type planetary gear mechanism 25 is held stationary to the transmission case 11 by the brake B1 so as to be unrotatable. In the embodiment, a gear ratio $\gamma 9$ of the ninth forward speed is determined as $\gamma 9 = 0.632$. In addition, the step ratio between the eighth forward speed and the ninth forward speed is determined as $\gamma 8/\gamma 9 = 1.242$.

The tenth forward speed is established by engaging the clutches C2 and C3 and the brake B1 and disengaging the remaining clutches C1 and C4 and brake B2. That is, to establish the tenth forward speed, the first sun gear 21s of the first planetary gear 21 and the second sun gear 22s of the second planetary gear 22 and the third sun gear 23s (second output element) of the Ravigneaux type planetary gear mechanism 25 are connected to each other by the clutch C2. In addition, the second ring gear 22r of the second planetary gear 22 and the third ring gear 23r (first output element) of the Ravigneaux type planetary gear mechanism 25 are connected to each other by the clutch C3. Further, the fourth sun gear 24s (fixable element) of the Ravigneaux type planetary gear mechanism 25 is held stationary to the transmission case 11 by the brake B1 so as to be unrotatable. In the embodiment, a gear ratio γ10 of the tenth forward speed is determined as γ10=0.588. In addition, the step ratio between the ninth forward speed and the tenth forward speed is determined as γ9/γ10=1.076. The spread (gear ratio width=the gear ratio γ1 of the first forward speed as the lowest shift speed/the gear ratio γ10 of the tenth forward speed as the highest shift speed) of the automatic transmission 20 is determined as γ1/γ10=8.660.

The reverse speed is established by engaging the clutches C2 and C3 and the brake B2 and disengaging the remaining clutches C1 and C4 and brake B1. That is, to establish the reverse speed, the first sun gear 21s of the first planetary gear 21 and the second sun gear 22s of the second planetary gear 22 and the third sun gear 23s (second output element) of the Ravigneaux type planetary gear mechanism 25 are connected to each other by the clutch C2. In addition, the second ring gear 22r of the second planetary gear 22 and the third ring gear 23r (first output element) of the Ravigneaux type planetary gear mechanism 25 are connected to each other by the clutch C3. Further, the second ring gear 22r (fixable element) of the second planetary gear 22 is held stationary to the transmission case 11 by the brake B2 so as to be unrotatable. In the embodiment, a gear ratio γrev of the reverse speed is determined as γrev=−4.860. In addition, the step ratio between the first forward speed and the reverse speed is determined as |γrev/γ1|=0.955.

As discussed above, with the automatic transmission 20, it is possible to provide the first to tenth forward speeds and the reverse speed by engaging and disengaging the clutches C1 to C4 and the brakes B1 and B2. As a result, with the automatic transmission 20, the spread can be further increased (in the embodiment, to 8.660) to improve the fuel efficiency of the vehicle at a high vehicle speed, in particular, and the acceleration performance at each shift speed. Further, the step ratio can be optimized (prevented from becoming higher) to improve the shifting feeling. Thus, with the automatic transmission 20, both the fuel efficiency and the drivability of the vehicle can be improved well.

In the automatic transmission 20, in addition, each of the first forward speed to the tenth forward speed and the reverse speed can be established by engaging three of the six engagement elements, namely the clutches C1 to C4 and the brakes B1 and B2, and disengaging the remaining three engagement elements. Consequently, it is possible to reduce the number of engagement elements to be disengaged to establish a shift speed compared to a transmission in which a plurality of shift speeds are established by engaging two of six clutches and brakes and disengaging the remaining four engagement elements, for example. As a result, the power transfer efficiency of the automatic transmission 20 can be further improved by reducing a drag loss due to slight contact between members in the engagement elements disengaged to establish a shift speed.

In the automatic transmission 20, further, as with the third carrier 23c (input element) of the Ravigneaux type planetary gear mechanism 25, the first carrier 21c (second rotary element) of the first planetary gear 21 is always coupled to the input shaft 20i via the intermediate shaft 20m. In addition, when each of the fourth forward speed to eighth forward speed is established, the first ring gear 21r (third rotary element) of the first planetary gear 21 is connected to the output shaft 20o (the second carrier 22c of the second planetary gear 22) by the clutch C4. Consequently, torque distribution to the clutch C4 can be reduced compared to a clutch that selectively connects between a first carrier (second rotary element) of a first planetary gear and an input shaft in a transmission according to the related art (see FIGS. 2 and 3 of U.S. Pat. No. 8,202,190) in which a first ring gear (third rotary element) of the first planetary gear is always coupled to an output shaft together with a second carrier (fifth rotary element) of a second planetary gear and the first carrier (second rotary element) is selectively connected to the input shaft, for example.

That is, in the automatic transmission 20, the first carrier 21c of the first planetary gear 21 is used as the second rotary element which is always coupled to the input shaft 20i, and the first ring gear 21r of the first planetary gear 21 is used as the third rotary element which is selectively connected to the output shaft 20o by the clutch C4. Consequently, torque transferred via the clutch C4 being engaged can be reduced to 1/(1+λ1) compared to the clutch of the transmission according to the related art described above which selectively connects between the first carrier and the input shaft. Thus, in the automatic transmission 20, torque distribution to the clutch C4 can be reduced well, and the clutch C4 can be made compact in at least one of the axial direction and the radial direction. As a result, with the automatic transmission 20, it is possible to improve both the power transfer efficiency and the drivability, and to suppress an increase in size of the entire device.

In addition, with the first and second planetary gears 21 and 22 each constituted as a single-pinion planetary gear, the power transfer efficiency of the automatic transmission 20 can be further improved by reducing a meshing loss between rotary elements of the first and second planetary gears 21 and 22 compared to a case where at least one of the two planetary gears is constituted as a double-pinion planetary gear, for example. Further, it is possible to improve the ease of assembly while suppressing an increase in weight of the entire device by reducing the number of parts. By adopting the Ravigneaux type planetary gear mechanism 25, which is a composite planetary gear train constituted by combining a double-pinion third planetary gear and a single-pinion fourth planetary gear with each other, as in the automatic transmission 20 described above, it is possible to improve the ease of assembly while suppressing an increase in weight of the entire device by reducing the number of parts.

Subsequently, a specific configuration of the automatic transmission 20 will be described in detail.

Figure 4:
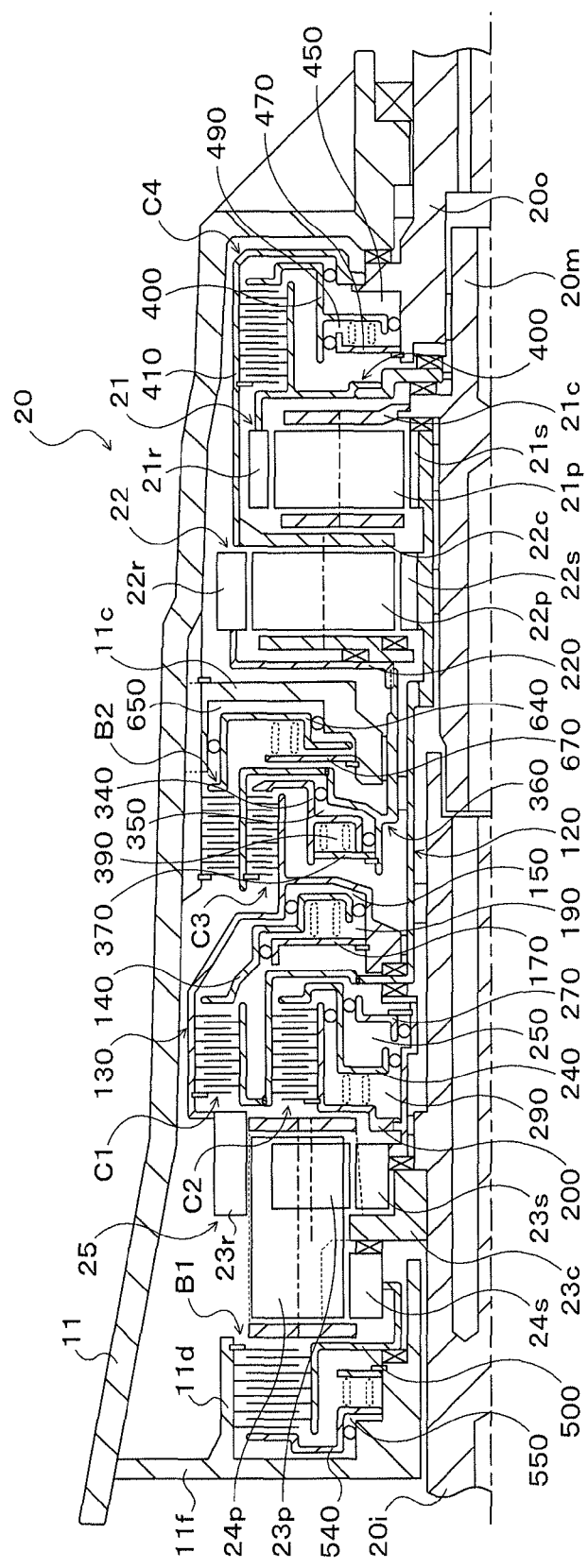
FIG. 4 is a sectional view illustrating the multi-speed transmission according to a preferred embodiment.
Figure 5:
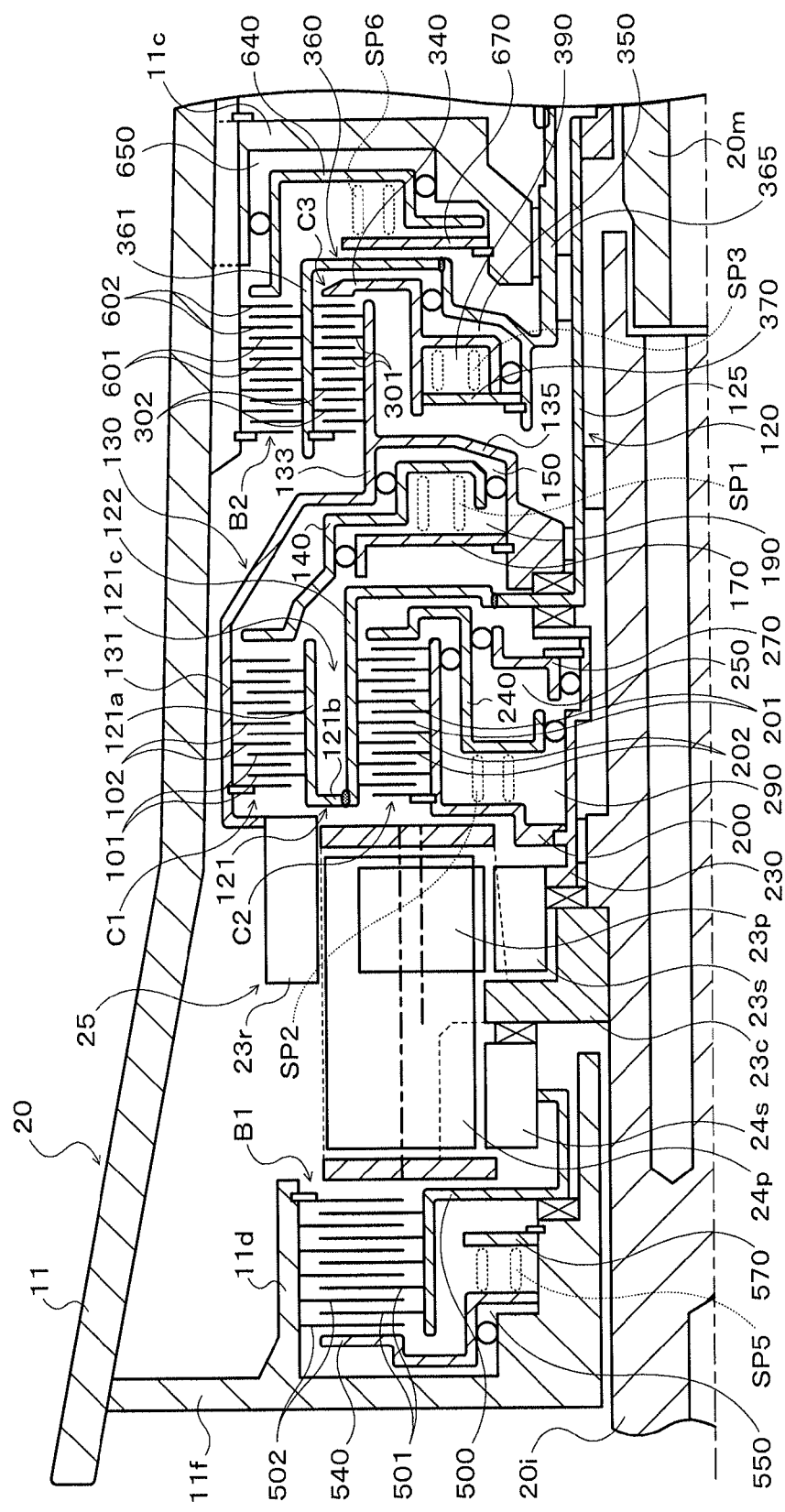
FIG. 5 is an enlarged sectional view illustrating the multi-speed transmission according to a preferred embodiment.
Figure 6:
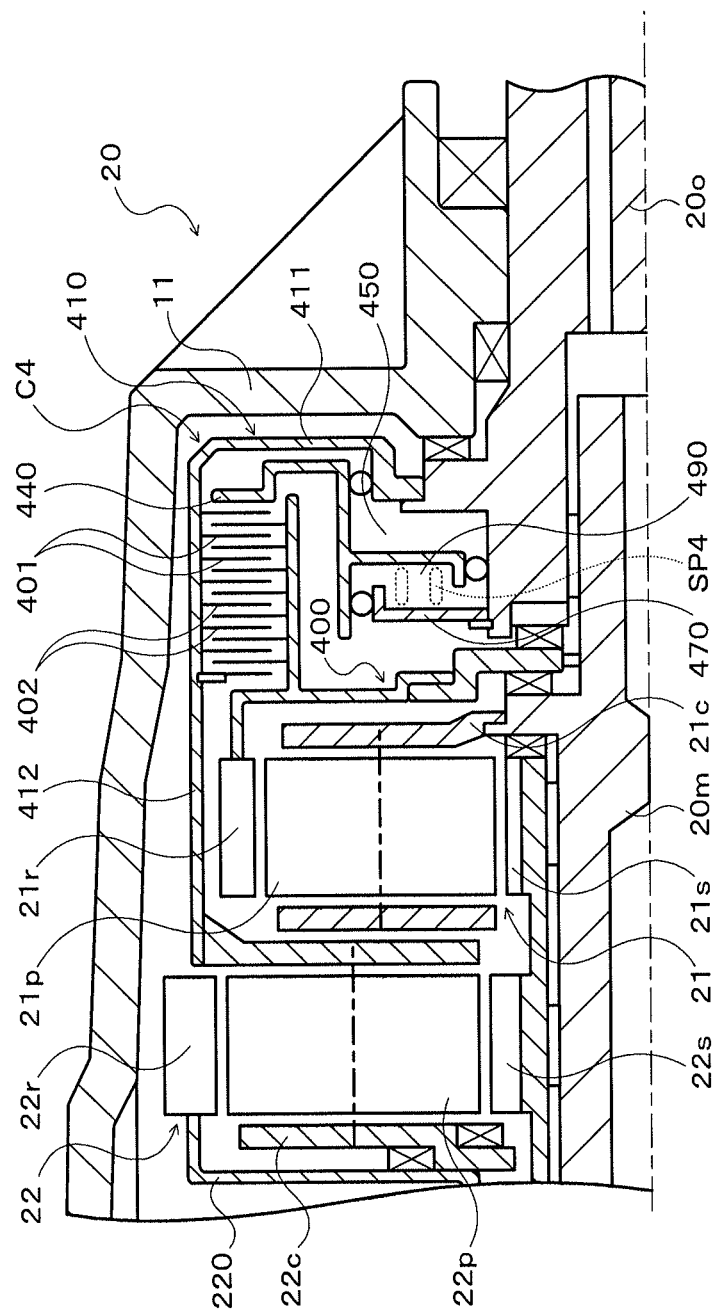
FIG. 6 is an enlarged sectional view illustrating the multi-speed transmission according to a preferred embodiment.

FIG. 4 is a sectional view illustrating the automatic transmission 20. FIGS. 5 and 6 are each an enlarged sectional view illustrating the automatic transmission 20. As illustrated in FIGS. 1 and 4, the brake B1, which holds (connects) the fourth sun gear 24s which is a fixable element of the Ravigneaux type planetary gear mechanism 25 stationary to the transmission case 11 such that the fourth sun gear 24s is unrotatable, is disposed the closest to the starting device 12 (engine), among the four clutches C1 to C4 and the two brakes B1 and B2. That is, the brake B1 is disposed on the side opposite to the first and second planetary gears 21 and 22 with respect to the Ravigneaux type planetary gear mechanism 25, that is, on the side of the front portion of the vehicle (left side in FIG. 1) with respect to the Ravigneaux type planetary gear mechanism 25.

As illustrated in FIGS. 4 and 5, the brake B1 includes: a brake hub 500 always coupled (fixed) to the fourth sun gear 24s; a plurality of friction plates 501; a plurality of separator plates 502 and backing plates disposed alternately with the friction plates 501; a piston 540 that presses the friction plates 501 and the separator plates 502 into friction engagement with each other; and a plurality of return springs (coil springs) SP5 that urge the piston 540 away from the friction plates 501 and the separator plates 502.

The plurality of friction plates 501 (the respective inner peripheral portions thereof) of the brake B1 are fitted with splines formed in the outer peripheral surface of the brake hub 500. Consequently, the friction plates 501 are supported by the brake hub 500 so as to rotate together with the brake hub 500 and be movable in the axial direction. In addition, the plurality of separator plates 502 (the respective outer peripheral portions thereof) of the brake B1 are fitted with spines formed in the inner peripheral surface of a drum portion 11d that extends in the axial direction of the input shaft 20i from an annular front support (a support portion on the front side) 11f fixed to the transmission case 11 to constitute a part of the transmission case 11 (stationary member). Consequently, the plurality of separator plates 502 are supported by the front support 11f so as to be unrotatable with respect to the transmission case 11 and movable in the axial direction. The piston 540 is supported by the front support 11f so as to be unrotatable with respect to the transmission case 11 and movable in the axial direction, and defines an engagement oil chamber 550 of the brake B1 together with the front support 11f.

The engagement oil chamber 550 of the brake B1 is supplied with an engagement hydraulic pressure (working oil) for the brake B1 regulated by a hydraulic control device via an oil passage formed in the input shaft 20i and the front support 11f. In addition, the plurality of return springs SP5 are disposed between the piston 540 and an annular spring support member 570 at intervals in the circumferential direction, and face the engagement oil chamber 550. The spring support member 570 is fixed to the front support 11f using a snap ring so as to be positioned on the side opposite to the engagement oil chamber 550 with respect to the piston 540. A single plate spring may be used as the return spring SP5 of the brake B1 in place of the plurality of coil springs.

As illustrated in FIGS. 1 and 4, the clutch C1 is disposed between the second planetary gear 22 and the Ravigneaux type planetary gear mechanism 25 so as to be proximate to the Ravigneaux type planetary gear mechanism 25 (third planetary gear). In addition, the clutch C2 is disposed between the second planetary gear 22 and the Ravigneaux type planetary gear mechanism 25 so as to be at least partially surrounded by a constituent member of the clutch C1 and be proximate to the Ravigneaux type planetary gear mechanism 25 (third planetary gear). Further, the clutch C3 is disposed between the second planetary gear 22 and the Ravigneaux type planetary gear mechanism 25 so as to be proximate to the second planetary gear 22. In addition, the brake B2 is disposed between the second planetary gear 22 and the Ravigneaux type planetary gear mechanism 25 so as to surround at least a part of the clutch C3 and be proximate to the second planetary gear 22.

As discussed above, the clutches C1 and C2 have the first sun gear 21s of the first planetary gear 21 and the second sun gear 22s of the second planetary gear 22 as common connection target elements. Therefore, as illustrated in FIGS. 4 and 5, the clutches C1 and C2 share a drum member 120 that is always coupled (fixed) to the first sun gear 21s and the second sun gear 22s of the second planetary gear 22 and that functions as a clutch hub of the clutch C1 and a clutch drum of the clutch C2. In addition, as discussed above, the clutches C1 and C3 have the third ring gear 23r of the Ravigneaux type planetary gear mechanism 25 as a common connection target element. Therefore, the clutches C1 and C3 share a drum member 130 that is always coupled (fixed) to the third ring gear 23r and that functions as a clutch drum of the clutch C1 and a clutch hub of the clutch C3. Further, as discussed above, the clutch C3 and the brake B2 have the second ring gear 22r of the second planetary gear 22 as a connection target element and a fixation target element, respectively. Therefore, the clutch C3 and the brake B2 share a drum member 360 that functions as a clutch drum of the clutch C3 and a brake hub of the brake B2.

The drum member 120 includes: a hub portion 121 used by the clutch C1; a drum portion 122 used by the clutch C2; and a coupling portion 125 always coupled (fixed) to the first sun gear 21s of the first planetary gear 21 and the second sun gear 22s of the second planetary gear 22 which are connection target elements of the clutches C1 and C2. The hub portion 121 has: a tubular portion 121a that has splines formed in the outer peripheral surface; and an annular flange portion 121b that extends radially inward from one end (left end in FIG. 5) of the tubular portion 121a. In the embodiment, the inner peripheral surface of the tubular portion 121a is formed in a recessed circular columnar surface that has no recesses or projections. Consequently, it is possible to secure the strength of the hub portion 121 without increasing the thickness of the tubular portion 121a. The length of the flange portion 121b in the radial direction is determined as desired in accordance with the torque capacity required for the clutches C1 and C2.

The drum portion 122 is formed in a bottomed cylindrical shape with an open end (left end in FIG. 5), and has a cylindrical portion and an annular side wall portion that extends radially inward from one end (right end in FIG. 5) of the cylindrical portion. Splines are formed in the inner peripheral surface of the drum portion 122 (cylindrical portion). The outer peripheral surface of the drum portion 122 (cylindrical portion) is formed in a circular columnar surface that has no recesses or projections. Consequently, it is possible to secure the strength of the drum portion 122 without increasing the thickness of the drum portion 122. The coupling portion 125 has an elongated tubular portion and a flange portion that extends radially outward from one end (left end in FIG. 5) of the tubular portion, and is supported coaxially and rotatably by the input shaft 20i via a bush, a radial bearing, or the like. The tubular portion (the other end thereof) of the coupling portion 125 is coupled to the first and second sun gears 21s and 22s via splines or the like. The flange portion of the coupling portion 125 is strongly fixed to the inner peripheral portion of the drum portion 122 by welding or the like. Consequently, the drum portion 122 is always coupled to the first and second sun gears 21s and 22s via the coupling portion 125.

As illustrated in FIG. 5, an end portion of the drum portion 122 on the opening side is press-fitted into the flange portion 121b (opening) of the hub portion 121, and the outer peripheral surface of the end portion of the drum portion 122 on the opening side and the inner peripheral surface of the flange portion 121b are strongly fixed to each other by welding. Consequently, the hub portion 121 is always coupled to the first and second sun gears 21s and 22s via the drum portion 122 and the coupling portion 125. The flange portion 121b, which is fixed to the outer periphery of the end portion of the drum portion 122 on the opening side functions as an annular rib. In addition, the inner peripheral surface of the tubular portion 121a of the hub portion 121 faces the outer peripheral surface of the drum portion 122 via a clearance that matches the dimension of the flange portion 121b in the radial direction. An annular space 121c (oil reservoir) is defined between the tubular portion 121a of the hub portion 121 and the drum portion 122. The space 121c opens on the side opposite to the end portion of the drum portion 122 on the opening side and the flange portion 121b.

The drum member 130 includes: a drum portion 131 used by the clutch C1; a hub portion 133 used by the clutch C3; and an annular support portion 135. In the embodiment, the drum portion 131, the hub portion 133, and the support portion 135 are shaped integrally by casting an aluminum alloy or the like, for example. The drum portion 131 has: a cylindrical portion that has an opening-side end portion (left end portion in FIG. 5) always coupled (fixed) to the third ring gear 23r of the Ravigneaux type planetary gear mechanism 25 which is the connection target element of the clutches C1 and C3; and an annular side wall portion that extends radially inward from one end (right end in FIG. 5) of the cylindrical portion. Splines are formed in the inner peripheral surface of the drum portion 131 (cylindrical portion). The outer peripheral surface of the drum portion 131 (cylindrical portion) is formed in a circular columnar surface that has no recesses or projections. Consequently, it is possible to secure the strength of the drum portion 131 without increasing the thickness of the drum portion 131.

The hub portion 133 of the drum member 130 extends from the annular side wall portion of the drum portion 131 toward the side (right side in FIG. 5) opposite to the opening-side end portion of the drum portion 131 (cylindrical portion). In the embodiment, the hub portion 133 is formed in a tubular shape that has a smaller outside diameter than that of the drum portion 131. Splines are formed in the outer peripheral surface of the hub portion 133. The inner peripheral surface of the hub portion 133 is formed in a recessed circular columnar surface that has no recesses or projections. Consequently, it is possible to secure the strength of the hub portion 133 without increasing the thickness of the hub portion 133. In the embodiment, the support portion 135 extends radially inward from the inner peripheral surface of the hub portion 133, and the inner peripheral portion of the support portion 135 is supported coaxially and rotatably by the coupling portion 125 (the outer peripheral surface thereof) of the drum member 120 via a bush, a radial bearing, or the like. Further, a thrust bearing is disposed between the support portion 135 of the drum member 130 and the flange portion of the coupling portion 125 of the drum member 120.

The drum member 360 includes: a drum portion 361 formed in a bottomed cylindrical shape with an open end (left end in FIG. 5); and a coupling portion 365 always coupled (fixed) to a ring gear flange (coupling member) 220 that rotates together with the second ring gear 22r of the second planetary gear 22 which is the connection target element (fixation target element) of the clutch C3 and the brake B2. The drum portion 361 of the drum member 360 has a cylindrical portion and an annular side wall portion that extends radially inward from one end (right end in FIG. 5) of the cylindrical portion. Splines are formed in the inner peripheral surface and the outer peripheral surface of the drum portion 361 (cylindrical portion). The outer peripheral portion of the coupling portion 365 is strongly fixed to the inner peripheral portion of the drum portion 361 (annular side wall portion) by welding or the like.

As illustrated in FIG. 5, the coupling portion 365 of the drum member 360 has a tubular portion that extends in the axial direction of the automatic transmission 20 (the input shaft 20i and the output shaft 20o). The tubular portion of the coupling portion 365 is rotatably supported (centered) by the input shaft 20i via a bush, the coupling portion 125 of the drum member 120, and a shaft portion of the second sun gear 22s. In addition, an annular center support (intermediate support portion) 11c is fixed to the transmission case 11. The center support 11c is positioned between the drum portion 361 (Ravigneaux type planetary gear mechanism 25) of the drum member 360 and the second planetary gear 22 to constitute a part of the transmission case 11 (stationary member). As illustrated in the drawing, the center support 11c extends radially inward from the inner peripheral surface of the transmission case 11, and includes a tubular inner peripheral portion that has a center hole. A sleeve made of iron is fixed to the inner peripheral surface of the inner peripheral portion. The sleeve suppresses wear of a bush (made of aluminum) due to slide of a seal member provided to the tubular portion of the coupling portion 365.

In addition, the distal end portion of the tubular portion of the coupling portion 365 is formed to have a smaller outside diameter than that of a portion surrounded by the inner peripheral surface of the inner peripheral portion of the center support 11c, and splines are formed in the outer peripheral surface of the distal end portion. Further, the ring gear flange 220 has: an inner peripheral portion fitted (spline-fitted) with the splines at the distal end portion of the coupling portion 365 (tubular portion); and an outer peripheral portion fitted (spline-fitted) with the splines formed in the inner peripheral surface of the second ring gear 22r. Consequently, the drum member 360 (drum portion 361) is always coupled to the second ring gear 22r via the two fitting portions (spline-fitting portions) provided on the inner peripheral side and the outer peripheral side of the ring gear flange 220.

In the embodiment, at least one of the fitting portion between the inner peripheral portion of the ring gear flange 220 and the drum member 360 and the fitting portion between the outer peripheral portion of the ring gear flange 220 and the second ring gear 22r is constituted as a fitting portion with no centering function. Such a fitting portion with no centering function has larger play in the radial direction (a gap between the bottom land of the splines on the ring gear flange 220 side and the top land of the splines of the coupling portion 365 or the second ring gear 22r) than backlash in the circumferential direction between splines teeth that are adjacent to each other. In addition, as discussed above, the distal end portion of the coupling portion 365 (tubular portion) of the drum member 360 has a smaller outside diameter than a portion supported by the inner peripheral surface of the center support 11c. Thus, the distal end portion of the coupling portion 365 is fitted with the inner peripheral portion of the ring gear flange 220 on the inner side (at a position proximate to the intermediate shaft 20m) with respect to the position at which the coupling portion 365 (tubular portion) is supported by the center support 11c.

The clutch C1, which includes the drum members 120 and 130 discussed above as constituent members, includes, in addition to the drum members 120 and 130: a plurality of friction plates (friction engagement plates) 101; a plurality of separator plates (friction engagement plates) 102 and backing plates disposed alternately with the friction plates 101; a piston 140 that presses the friction plates 101 and the separator plates 102 into friction engagement with each other; a plurality of return springs (coil springs) SP1 that urge the piston 140 away from the friction plates 101 and the separator plates 102; and an annular cancel plate (cancellation oil chamber defining member) 170.

The plurality of friction plates 101 (the respective inner peripheral portions thereof) of the clutch C1 are fitted with splines formed in the outer peripheral surface of the hub portion 121, that is, the tubular portion 121a, of the drum member 120 which is disposed to be surrounded by the drum portion 131 of the drum member 130. Consequently, the plurality of friction plates 101 are supported by the drum member 120 which functions as a clutch hub so as to rotate together with the hub portion 121 and be movable in the axial direction. In addition, the plurality of separator plates 102 (the respective outer peripheral portions thereof) of the clutch C1 are fitted with splines formed in the inner peripheral surface of the drum portion 131 of the drum member 130. Consequently, the plurality of separator plates 102 are supported by the drum member 130 which functions as a clutch drum so as to rotate together with the drum portion 131 and be movable in the axial direction.

The piston 140 is disposed between the drum portion 131 of the drum member 130 and the drum portion 122 of the drum member 120, and supported by the support portion 135 of the drum member 130 so as to rotate together with the drum member 130 and be movable in the axial direction. In addition, the cancel plate 170 is disposed between the piston 140 and the drum portion 122 of the drum member 120, that is, on the side opposite to the support portion 135 of the drum member 130 with respect to the piston 140, and fixed to the support portion 135 using a snap ring. The piston 140 defines an engagement oil chamber (first engagement oil chamber) 150 of the clutch C1 together with the support portion 135 of the drum member 130. Further, the cancel plate 170 defines a centrifugal hydraulic pressure cancellation chamber (first centrifugal hydraulic pressure cancellation chamber) 190 for canceling a centrifugal hydraulic pressure generated in the engagement oil chamber 150 together with the piston 140 and the support portion 135.

Consequently, all the oil chambers of the clutch C1, that is, the engagement oil chamber 150 and the centrifugal hydraulic pressure cancellation chamber 190, are defined by the drum member 130 (support portion 135), the piston 140, and the cancel plate 170, which rotate together with the third ring gear 23r (first output element) of the Ravigneaux type planetary gear mechanism 25. In the embodiment, in addition, as illustrated in FIGS. 4 and 5, the engagement oil chamber 150 and the centrifugal hydraulic pressure cancellation chamber 190 of the clutch C1 are defined at a location away from the Ravigneaux type planetary gear mechanism 25 and in proximity to the second planetary gear 22 with respect to the hub portion 121 and the drum portion 122 of the drum member 120.

The engagement oil chamber 150 of the clutch C1 is supplied with an engagement hydraulic pressure (working oil) for the clutch C1 regulated by a hydraulic control device via an oil passage formed in the input shaft 20i, the coupling portion 125 of the drum member 120, the support portion 135 of the drum member 130, and so forth. In addition, the centrifugal hydraulic pressure cancellation chamber 190 is supplied with working oil (e.g. drain oil for lubrication and cooling) from a hydraulic control device via an oil passage formed in the input shaft 20i, the coupling portion 125 of the drum member 120, the support portion 135 of the drum member 130, and so forth. The plurality of return springs SP1 are disposed inside the centrifugal hydraulic pressure cancellation chamber 190 at intervals in the circumferential direction so as to be positioned between the piston 140 and the cancel plate 170. A single leaf spring may be used as the return spring SP1 of the clutch C1 in place of the plurality of coil springs.

The clutch C2, which includes the drum member 120 discussed above as a constituent member, includes, in addition to the drum member 120: a clutch hub 200; a plurality of friction plates (first friction engagement plates) 201; a plurality of separator plates 202 (second friction engagement plates) and backing plates; a piston 240 that presses the friction plates 201 and the separator plates 202 into friction engagement with each other; an annular oil chamber defining member 270; and a plurality of return springs (coil springs) SP2 that urge the piston 240 away from the friction plates 201 and the separator plates 202.

The clutch hub 200 has: a tubular portion that has splines formed in the outer peripheral surface; and an annular coupling portion that extends radially inward from the tubular portion and that is always coupled (fixed) to a shaft portion 230 that extends in the axial direction from the third sun gear 23s of the Ravigneaux type planetary gear mechanism 25. The plurality of friction plates 201 (the respective outer peripheral portions thereof) of the clutch C2 are fitted with splines formed in the inner peripheral surface of the drum portion 122 of the drum member 120 which is disposed to surround the clutch hub 200. Consequently, the plurality of friction plates 201 are supported by the drum member 120 which functions as a clutch drum so as to rotate together with the drum portion 122 and be movable in the axial direction. In addition, the plurality of separator plates 202 (the respective inner peripheral portions thereof) of the clutch C2 are fitted with splines formed in the outer peripheral surface of the clutch hub 200 (tubular portion). Consequently, the plurality of separator plates 202 are supported by the clutch hub 200 so as to rotate together with the clutch hub 200 and be movable in the axial direction.

The piston 240 is disposed so as to be surrounded by the drum portion 122 of the drum member 120 and such that a part of the piston 240 on the inner peripheral side is inserted inside the tubular portion of the clutch hub 200. The piston 240 is supported by the shaft portion 230 of the third sun gear 23s so as to rotate together with the shaft portion 230 and be movable in the axial direction. In addition, the oil chamber defining member 270 is fixed to the shaft portion 230 using a snap ring so as to be positioned between the piston 240 and the drum member 120. That is, the oil chamber defining member 270 is positioned on the side opposite to the coupling portion of the clutch hub 200 and the third sun gear 23s with respect to the piston 240 (the inner peripheral portion thereof). The piston 240 defines an engagement oil chamber (second engagement oil chamber) 250 of the clutch C2 together with the oil chamber defining member 270 and the shaft portion 230. Further, the piston 240 defines a centrifugal hydraulic pressure cancellation chamber (second centrifugal hydraulic pressure cancellation chamber) 290 for canceling a centrifugal hydraulic pressure generated in the engagement oil chamber 250 together with the clutch hub 200 and the shaft portion 230.

Consequently, all the oil chambers of the clutch C2, that is, the engagement oil chamber 250 and the centrifugal hydraulic pressure cancellation chamber 290, are defined by the shaft portion 230, the piston 240, and the oil chamber defining member 270, which rotate together with the third sun gear 23s (second output element) of the Ravigneaux type planetary gear mechanism 25. In the embodiment, in addition, as illustrated in FIGS. 4 and 5, the engagement oil chamber 250 and the centrifugal hydraulic pressure cancellation chamber 290 of the clutch C2 are defined at a location in proximity to the Ravigneaux type planetary gear mechanism 25 with respect to the cancel plate 170 of the clutch C1, that is, the engagement oil chamber 150 and the centrifugal hydraulic pressure cancellation chamber 190 of the clutch C1. Further, the engagement oil chamber 250 and the centrifugal hydraulic pressure cancellation chamber 290 are located away from the second planetary gear 22 and in proximity to the input shaft 20*i*.

The engagement oil chamber 250 of the clutch C2 is supplied with an engagement hydraulic pressure (working oil) for the clutch C2 regulated by a hydraulic control device via an oil passage formed in the input shaft 20*i*, the shaft portion 230 of the third sun gear 23*s*, and so forth. In addition, the centrifugal hydraulic pressure cancellation chamber 290 is supplied with working oil (e.g. drain oil for lubrication and cooling) from a hydraulic control device via an oil passage formed in the input shaft 20*i*, the shaft portion 230 of the third sun gear 23*s*, and so forth. The plurality of return springs SP2 are disposed inside the centrifugal hydraulic pressure cancellation chamber 290 at intervals in the circumferential direction so as to be positioned between the piston 240 and the clutch hub 200 (coupling portion). A single leaf spring may be used as the return spring SP2 of the clutch C2 in place of the plurality of coil springs. In the embodiment, further, the shaft portion 230 of the third sun gear 23*s*, which serves as a hub member, and the clutch hub 200 are supported coaxially and rotatably by the input shaft 20*i* via a bush or a radial bearing, and supported in the axial direction by the third carrier 23*c* of the Ravigneaux type planetary gear mechanism 25 and the coupling portion 125 of the drum member 120 via a thrust bearing.

The clutch C3, which includes the drum members 130 and 360 discussed above as constituent members, includes, in addition to the drum members 130 and 360: a plurality of friction plates 301; a plurality of separator plates 302 and backing plates disposed alternately with the friction plates 301; a piston 340 that presses the friction plates 301 and the separator plates 302 into friction engagement with each other; a plurality of return springs (coil springs) SP3 that urge the piston 340 away from the friction plates 301 and the separator plates 302; and an annular cancel plate (cancellation oil chamber defining member) 370.

The plurality of friction plates 301 (the respective inner peripheral portions thereof) of the clutch C3 are fitted with splines formed in the outer peripheral surface of the hub portion 133 of the drum member 130 which extends toward the second planetary gear 22, that is, toward the rear portion of the vehicle. Consequently, the plurality of friction plates 301 are supported by the drum member 130 which functions as a clutch hub so as to rotate together with the hub portion 133 and be movable in the axial direction. In addition, the plurality of separator plates 302 (the respective outer peripheral portions thereof) of the clutch C3 are fitted with splines formed in the inner peripheral surface of the drum portion 361 of the drum member 360 which is disposed to surround the hub portion 133 of the drum member 130. Consequently, the plurality of separator plates 302 are supported by the drum member 360 which functions as a clutch drum so as to rotate together with the drum portion 361 and be movable in the axial direction.

The piston 340 is disposed between the drum member 130 and the drum portion 361 of the drum member 360, and supported by the coupling portion 365 of the drum member 360 so as to rotate together with the drum member 360 and be movable in the axial direction. In addition, the cancel plate 370 is disposed between the piston 340 and the drum member 130, that is, on the side opposite to the coupling portion 365 of the drum member 360 with respect to the piston 340, and fixed to the coupling portion 365 using a snap ring. The piston 340 defines an engagement oil chamber (third engagement oil chamber) 350 of the clutch C3 together with the drum member 360. Further, the cancel plate 370 defines a centrifugal hydraulic pressure cancellation chamber (third centrifugal hydraulic pressure cancellation chamber) 390 for canceling a centrifugal hydraulic pressure generated in the engagement oil chamber 350 together with the piston 340.

Consequently, all the oil chambers of the clutch C3, that is, the engagement oil chamber 350 and the centrifugal hydraulic pressure cancellation chamber 390, are defined by the drum member 360, the piston 340, and the cancel plate 370, which rotate together with the second ring gear 22*r* of the second planetary gear 22. In the embodiment, in addition, as illustrated in FIG. 5, the engagement oil chamber 350 and the centrifugal hydraulic pressure cancellation chamber 390 of the clutch C3 are defined at a location away from the Ravigneaux type planetary gear mechanism 25 and in proximity to the second planetary gear 22 with respect to the support portion 135 of the drum member 130, that is, the engagement oil chamber 150 and the centrifugal hydraulic pressure cancellation chamber 190 of the clutch C1.

The engagement oil chamber 350 of the clutch C3 is supplied with an engagement hydraulic pressure (working oil) for the clutch C3 regulated by a hydraulic control device via an oil passage formed in the center support 11*c*, the coupling portion 365 of the drum member 360, and so forth. In addition, the centrifugal hydraulic pressure cancellation chamber 390 is supplied with working oil (e.g. drain oil for lubrication and cooling) from a hydraulic control device via an oil passage formed in the intermediate shaft 20*m*, the coupling portion 125 of the drum member 120, the coupling portion 365 of the drum member 360, and so forth. The plurality of return springs SP3 are disposed inside the centrifugal hydraulic pressure cancellation chamber 390 at intervals in the circumferential direction so as to be positioned between the piston 340 and the cancel plate 370. A single leaf spring may be used as the return spring SP3 of the clutch C3 in place of the plurality of coil springs.

As illustrated in FIGS. 4 and 5, the brake B2, which includes the drum member 360 discussed above as a constituent member, includes: a plurality of friction plates 601; a plurality of separator plates 602 and backing plates disposed alternately with the friction plates 601; a piston 640 that presses the friction plates 601 and the separator plates 602 into friction engagement with each other; and a plurality of return springs (coil springs) SP6 that urge the piston 640 away from the friction plates 601 and the separator plates 602.

The plurality of friction plates 601 (the respective inner peripheral portions thereof) of the brake B2 are fitted with splines formed in the outer peripheral surface of the drum portion 361 of the drum member 360. The friction plates 601 are supported by the drum member 360 which functions as a brake hub so as to rotate together with the drum portion 361 and be movable in the axial direction. In addition, the plurality of separator plates 602 (the respective outer peripheral portions thereof) of the brake B2 are fitted with splines formed in the inner peripheral surface of the transmission case 11. The separator plates 602 are supported by the transmission case 11 so as to be unrotatable with respect to the transmission case 11 and movable in the axial direction. As illustrated in FIGS. 4 and 5, the friction plates 601 and the separator plates 602 of the brake B2 are disposed on the side opposite to the second planetary gear 22 with respect to the center support 11*c*, that is, on the Ravigneaux type planetary gear mechanism 25 side with respect to the center support 11*c*. The piston 640 is supported by the center support 11*c* discussed above so as to be unrotatable with respect to the transmission case 11 and movable in the axial direction, and defines an engagement oil chamber 650 of the brake B2 together with the center support 11*c*.

The engagement oil chamber 650 of the brake B2 is supplied with an engagement hydraulic pressure (working oil) for the brake B2 regulated by a hydraulic control device via an oil passage formed in the center support 11*c*. In addition, the plurality of return springs SP6 are disposed between the piston 640 and an annular spring support member 670 at intervals in the circumferential direction, and face the engagement oil chamber 650. The spring support member 670 is fixed to the center support 11*c* using a snap ring so as to be positioned on the side opposite to the engagement oil chamber 650 with respect to the piston 640. A single leaf spring may be used as the return spring SP6 of the brake B2 in place of the plurality of coil springs.

As illustrated in FIGS. 4 and 6, the clutch C4 is disposed the closest to the output shaft 20*o*, among the four clutches C1 to C4 and the two brakes B1 and B2. That is, the clutch C4 is disposed on the side opposite to the Ravigneaux type planetary gear mechanism 25 with respect to the second planetary gear 22, that is, on the side of the rear portion of the vehicle (right side in FIG. 1) with respect to the first planetary gear 21. As illustrated in FIG. 6, the clutch C4 includes; a clutch hub 400; a clutch drum 410; a plurality of friction plates 401; a plurality of separator plates 402 and backing plates disposed alternately with the friction plates 401; a piston 440 that presses the friction plates 401 and the separator plates 402 into friction engagement with each other; a plurality of return springs (coil springs) SP4 that urge the piston 440 away from the friction plates 401 and the separator plates 402; and an annular cancel plate (cancellation oil chamber defining member) 470.

The clutch hub 400 is rotatably supported by the intermediate shaft 20*m* via a bush or a radial bearing, and supported in the axial direction by a flange portion formed on the intermediate shaft 20*m* and the output shaft 20*o* via two thrust bearings disposed on the front and the rear. In addition, the clutch hub 400 is always coupled (fixed) to the first ring gear 21*r* of the first planetary gear 21 via splines and a snap ring. The clutch drum 410 has: an annular side wall portion 411 fixed to an expanded diameter portion formed on the output shaft 20*o* by welding or the like; and a cylindrical portion 412 formed in a bottomed cylindrical shape with an open end (left end in FIG. 6) and joined to the outer peripheral portion of the annular side wall portion 411 by welding or the like to extend along the axial direction of the output shaft 20*o* etc. An end portion (left end portion in FIG. 7) of the cylindrical portion 412 on the opening side is always coupled (fixed) to the second carrier 22*c* of the second planetary gear 22 via splines or the like.

The plurality of friction plates 401 (the respective inner peripheral portions thereof) of the clutch C4 are fitted with splines formed in the outer peripheral surface of the clutch hub 400. Consequently, the plurality of friction plates 401 are supported by the clutch hub 400 so as to rotate together with the clutch hub 400 and be movable in the axial direction. In addition, the plurality of separator plates 402 of the clutch C4 are fitted with splines formed in the inner peripheral surface of the cylindrical portion 412 of the clutch drum 410. Consequently, the plurality of separator plates 402 (the respective outer peripheral portions thereof) are supported by the clutch drum 410 so as to rotate together with the clutch drum 410 and be movable in the axial direction.

The piston 440 is disposed in the cylindrical portion 412 of the clutch drum 410 on the first planetary gear 21 side (on the side of the front portion of the vehicle) with respect to the annular side wall portion 411, and supported by the output shaft 20*o* so as to rotate together with the output shaft 20*o* and be movable in the axial direction. In addition, the cancel plate 470 is fixed to the output shaft 20*o* using a snap ring so as to be positioned on the first planetary gear 21 side (on the side of the front portion of the vehicle) with respect to the piston 440. The piston 440 defines an engagement oil chamber (first engagement oil chamber) 450 of the clutch C4 together with the clutch drum 410, which serves as an oil chamber defining portion, and the output shaft 20*o*. Further, the cancel plate 170 defines a centrifugal hydraulic pressure cancellation chamber (fourth centrifugal hydraulic pressure cancellation chamber) 490 for canceling a centrifugal hydraulic pressure generated in the engagement oil chamber 450 together with the piston 440 and the output shaft 20*o*. Consequently, all the oil chambers of the clutch C4, that is, the engagement oil chamber 450 and the centrifugal hydraulic pressure cancellation chamber 490, are defined by the clutch drum 410, the piston 440, and the cancel plate 470, which rotate together with the second carrier 22*c* of the second planetary gear 22 and the output shaft 20*o*.

The engagement oil chamber 450 of the clutch C4 is supplied with an engagement hydraulic pressure (working oil) for the clutch C4 regulated by a hydraulic control device via an oil passage formed in the transmission case 11, the output shaft 20*o*, and so forth. In addition, the centrifugal hydraulic pressure cancellation chamber 490 is supplied with working oil (e.g. drain oil for lubrication and cooling) from a hydraulic control device via an oil passage formed in the transmission case 11, the output shaft 20*o*, and so forth. The plurality of return springs SP4 are disposed inside the centrifugal hydraulic pressure cancellation chamber 490 at intervals in the circumferential direction so as to be positioned between the piston 440 and the cancel plate 470. A single leaf spring may be used as the return spring SP4 of the clutch C4 in place of the plurality of coil springs. In addition, the output shaft 20*o* is rotatably supported by the transmission case 11 via a bush, a radial bearing, or a thrust bearing.

In the automatic transmission 20 configured as discussed above, the clutch C2 corresponds to the third sun gear 23*s* (see FIG. 2) which rotates at a higher speed, among of the third ring gear 23*r* (first output element) and the third sun gear 23*s* (second output element) of the Ravigneaux type planetary gear mechanism 25. The clutch C2 is disposed between the Ravigneaux type planetary gear mechanism 25 and the second planetary gear 22 which is disposed in proximity to the Ravigneaux type planetary gear mechanism 25 with respect to the first planetary gear 21. Thus, in the automatic transmission 20, there is no need to configure the constituent members of the clutch C2 to bypass the first and second planetary gears 21 and 22 with a large diameter. Further, the engagement oil chamber 250 and the centrifugal hydraulic pressure cancellation chamber 290 of the clutch C2 are defined at a location in proximity to the input shaft 20*i* with respect to the engagement oil chamber 150 and the centrifugal hydraulic pressure cancellation chamber 190 of the clutch C1.

Consequently, an increase in size of the automatic transmission 20 can be suppressed by suppressing an increase in dimensions (such as outside diameter, axial length, and thickness), that is, weight, due to securing the strength of the constituent members of the clutch C2 such as the shaft portion 230, the piston 240, and the oil chamber defining member 270. In addition, it is possible to improve the speed change performance by reducing the inertia (equivalent inertia for the input shaft 20*i*) during rotation of the third sun gear 23*s*, which rotates at a higher speed than that of the third ring gear 23r, and the shaft portion 230, the piston 240, and the oil chamber defining member 270, which rotate together with the third sun gear 23s. Further, it is possible to further reduce the inertia during rotation of the members which rotate together with the third sun gear 23s, which rotates at a higher speed than that of the third ring gear 23r, by coupling the clutch hub 200, which can be made smaller in diameter than the drum member 120 which serves as a clutch drum, to the third sun gear 23s.

In the automatic transmission 20, in addition, the engagement oil chamber 150 and the centrifugal hydraulic pressure cancellation chamber 190 of the clutch C1 and the engagement oil chamber 350 and the centrifugal hydraulic pressure cancellation chamber 390 of the clutch C3 are disposed between the clutch C2 (the engagement oil chamber 250 and the centrifugal hydraulic pressure cancellation chamber 290) and the second planetary gear 22, which is disposed in proximity to the Ravigneaux type planetary gear mechanism 25 with respect to the first planetary gear 21. Additionally, the clutch C4 is disposed on the side opposite to the Ravigneaux type planetary gear mechanism 25 (on the side of the rear portion of the vehicle) with respect to the second planetary gear 22, which is disposed in proximity to the Ravigneaux type planetary gear mechanism 25 with respect to the first planetary gear 21. Consequently, it is possible to provide the clutch C2, which corresponds to the third sun gear 23s which rotates at a higher speed than that of the third ring gear 23r, in proximity to the Ravigneaux type planetary gear mechanism 25. Thus, it is possible to reduce the axial length, that is, the weight, of the constituent members of the clutch C2 such as the shaft portion 230, the piston 240, and the oil chamber defining member 270, which rotate together with the third sun gear 23s. As a result, it is possible to further improve the speed change performance by reducing the inertia during rotation of the shaft portion 230, the piston 240, the oil chamber defining member 270, etc., and to suppress an increase in axial length of the automatic transmission 20.

In the automatic transmission 20, further, the clutch C1 (such as the drum portion 131), which corresponds to the third ring gear 23r (first output element) of the Ravigneaux type planetary gear mechanism 25, is disposed so as to surround generally the entire clutch C2, that is, the drum portion 122 of the drum member 120, the clutch hub 200, the friction plates 201, the separator plates 202, the oil chamber defining member 270, and so forth. Consequently, it is possible to suppress an increase in axial length of the automatic transmission 20 better. In the automatic transmission 20, in addition, the brake B1 is disposed on the side opposite to the first and second planetary gears 21 and 22 (on the side of the front portion of the vehicle) with respect to the Ravigneaux type planetary gear mechanism 25. Further, the brake B2 (such as the drum portion 361 of the drum member 360, the friction plates 601, and the separator plates 602) is disposed between the clutch C2 and the second planetary gear 22, which is disposed in proximity to the Ravigneaux type planetary gear mechanism 25 with respect to the first planetary gear 21, so as to surround a part of the clutch C3, that is, the hub portion 133, the friction plates 301, the separator plates 302, the oil chamber defining member 270, and so forth. Consequently, it is possible to suppress an increase in axial length of the automatic transmission 20 while securing a sufficient space for arrangement of the clutches C1, C2, and C3 between the Ravigneaux type planetary gear mechanism 25 and the second planetary gear 22, which is disposed in proximity to the Ravigneaux type planetary gear mechanism 25 with respect to the first planetary gear 21.

Subsequently, operation of the automatic transmission 20 will be described.

In the automatic transmission 20, when each of the second forward speed to the sixth forward speed and the eighth forward speed to the tenth forward speed is established, the brake B1 is engaged to hold the fourth sun gear 24s (fixable element) of the Ravigneaux type planetary gear mechanism 25 stationary such that the fourth sun gear 24s is unrotatable (see FIG. 3). Consequently, power, which has been transferred from the input shaft 20i to the third carrier 23c (input element), is transferred to the third sun gear 23s and the third ring gear 23r (see FIG. 2) with the speed of the power increased by the Ravigneaux type planetary gear mechanism 25 such that the rotational speed of the third sun gear 23s (second output element) is higher than the rotational speed of the third ring gear 23r (first output element). Thus, during operation of the automatic transmission 20, the third ring gear 23r and the third sun gear 23s of the Ravigneaux type planetary gear mechanism 25 rotate at a rotational speed that is equal to or more than that of the third carrier 23c, that is, the input shaft 20i, except when the reverse speed is established.

In the light of this, in the automatic transmission 20, as discussed above, the engagement oil chamber 150 and the centrifugal hydraulic pressure cancellation chamber 190 of the clutch C1, which corresponds to the third ring gear 23r, are defined by the drum member 130 (support portion 135), the piston 140, and the cancel plate 170, which rotate together with the third ring gear 23r. In addition, the engagement oil chamber 250 and the centrifugal hydraulic pressure cancellation chamber 290 of the clutch C2, which corresponds to the third sun gear 23s, are defined by the shaft portion 230, the piston 240, and the oil chamber defining member 270, which rotate together with the third sun gear 23s. Consequently, it is possible to prevent working oil that has once been supplied from flowing out of the centrifugal hydraulic pressure cancellation chambers 190 and 290 well by keeping the rotational speed of the centrifugal hydraulic pressure cancellation chambers 190 and 290 of the clutches C1 and C2 high during operation of the automatic transmission 20. As a result, with the automatic transmission 20, it is possible to secure a good speed change performance by smoothly engaging the clutches C1 and C2 which correspond to the third ring gear 23r and the third sun gear 23s, respectively, which are the output elements of the Ravigneaux type planetary gear mechanism 25.

In the automatic transmission 20 described above, in addition, the clutch C1 has: the drum member 130 which functions as a clutch drum that rotates together with the third ring gear 23r; the piston 140 which defines the engagement oil chamber 150 together with the support portion 135 of the drum member 130; and the cancel plate 170 which is fixed to the support portion 135 of the drum member 130 to define the centrifugal hydraulic pressure cancellation chamber 190 together with the piston 140. Further, the clutch C2 has: the clutch hub 200 which is always coupled to the third sun gear 23s; the piston 240 which defines the centrifugal hydraulic pressure cancellation chamber 290 together with the clutch hub 200; and the oil chamber defining member 270 which is fixed to the clutch hub 200 to define the engagement oil chamber 250 together with the piston 240. Consequently, the engagement oil chamber 150 and the centrifugal hydraulic pressure cancellation chamber 190 of the clutch C1 can be defined by members that rotate together with the third ring gear 23*r* (first output element), and the engagement oil chamber 250 and the centrifugal hydraulic pressure cancellation chamber 290 of the clutch C2 can be defined by members that rotate together with the third sun gear 23*s* (second output element).

In the automatic transmission 20 described above, as illustrated in FIG. 2, the maximum rotational speed of the first and second sun gears 21*s* and 22*s* of the first and second planetary gears 21 and 22, which are common connection target elements of the clutches C1 and C2, is the highest among those of the plurality of rotary elements included in the automatic transmission 20, that is, the first to fourth sun gears 21*s* to 24*s*, the first to third ring gears 21*r* to 23*r*, and the first to third carriers 21*c* to 23*c*, when the output shaft 20*o* rotates forward (rotates in the direction in which the vehicle travels forward). In the light of this, in the automatic transmission 20, the engagement oil chamber 150 and the centrifugal hydraulic pressure cancellation chamber 190 of the clutch C1 are defined by members that rotate together with the third ring gear 23*r*, the maximum rotational speed of which is lower than that of the first and second sun gears 21*s* and 22*s*, and the engagement oil chamber 250 and the centrifugal hydraulic pressure cancellation chamber 290 of the clutch C2 are defined by members that rotate together with the third sun gear 23*s*, the maximum rotational speed of which is lower than that of the first and second sun gears 21*s* and 22*s*. Consequently, the number of constituent members of the clutches C1 and C2 that rotate together with the first and second sun gears 21*s* and 22*s* can be reduced. As a result, it is possible to further improve the speed change performance of the automatic transmission 20 by reducing the inertia during rotation of constituent members of the clutches C1 and C2 that rotate together with the first and second sun gears 21*s* and 22*s* which rotate at a high speed, that is, the drum member 120, the friction plates 101 and 201, and so forth. In the automatic transmission 20, further, the engagement oil chambers 150 and 250 and the centrifugal hydraulic pressure cancellation chambers 190 and 290 are provided on the side of the third ring gear 23*r* and the third sun gear 23*s*, which rotate relatively stably, rather than providing the engagement oil chambers and the centrifugal hydraulic pressure cancellation chambers on the side of the first and second sun gears 21*s* and 22*s*, the rotational speed of which is fluctuated significantly in accordance with the shift speed. Consequently, the speed change performance can be improved by reducing fluctuations in centrifugal hydraulic pressure for each shift speed.

In addition, even if the first and second sun gears 21*s* and 22*s*, which are connection target elements of the clutches C1 and C2, rotate at a very high rotational speed, deformation of the drum member 120, in particular expansion of an end portion, on the opening side, of the drum portion 122 which serves as a clutch drum of the clutch C2, can be suppressed well by configuring the drum member 120, which is shared by the clutches C1 and C2, as discussed above. That is, the tubular hub portion 121, which serves as a clutch hub of the clutch C1, is fixed to the outer periphery of the end portion, on the opening side, of the drum portion 122 with an open end which serves as a clutch drum of the clutch C2. Consequently, it is possible to significantly improve the strength of the drum member 120, in particular the end portion, on the opening side, of the drum portion 122 which serves as a clutch drum of the clutch C2. Thus, even if the rotational speed of the drum member 120, that is, the first and second sun gears 21*s* and 22*s*, is increased, deformation of the drum member 120, in particular expansion of the end portion on the drum portion 122 on the opening side can be suppressed well.

Further, the hub portion 121 of the drum member 120 includes: the tubular portion 121*a* which is fitted with the inner peripheral portion of the friction plates 101 of the clutch C1; and the annular flange portion 121*b* which extends radially inward from one end of the tubular portion 121*a* and which is fixed to the outer periphery of an end portion of the drum portion 122 on the opening side, and the flange portion 121*b* functions as an annular rib. Thus, the strength of an end portion of the drum portion 122 on the opening side, and hence the entire drum member 120, can be improved better. With the strength of the drum member 120, that is, the drum portion 122 which serves as a clutch drum, improved, an increase in weight of the drum member 120 (drum portion 122) can be suppressed to reduce the inertia during rotation, which makes it possible to improve the speed change performance of the automatic transmission 20.

In the automatic transmission 20, in addition, the inner peripheral surface of the tubular portion 121*a* of the hub portion 121, which serves as a clutch hub of the clutch C1, and the outer peripheral surface of the drum portion 122, which serves as a clutch drum of the clutch C2, face each other via a clearance. Thus, the annular space 121*c* (oil reservoir) is defined between the tubular portion 121*a* and the drum portion 122. The space 121*c* opens on the side opposite to the end portion of the drum portion 122 on the opening side. Consequently, not only working oil that has passed through the inside, that is, the friction plates 201 of the clutch C2 which are fitted with the drum portion 122 and the separator plates 202 which are fitted with the clutch hub 200 of the clutch C2 but also working oil scattered around the drum member 120 (drum portion 122) can be received in the space 121*c* between the hub portion 121 and the drum portion 122. As a result, working oil that serves as a lubrication and cooling medium can be supplied from the space 121*c* to the friction plates 101 of the clutch C1 which are fitted with the hub portion 121 and the separator plates 102 of the clutch C1 which are fitted with the drum member 130.

Thus, in the automatic transmission 20, deformation of the drum member 120 which is shared by the clutches C1 and C2 as a clutch hub of one of the clutches C1 and C2 and a clutch drum of the other, that is, deformation of the drum portion 122 (a clutch drum of the clutch C2) which is disposed to be at least partially surrounded by a constituent member of the clutch C1, can be suppressed well. In addition, the friction plates 101, which are fitted with the hub portion 121 and disposed around the drum portion 122, and the separator plates 102, which are fitted with the drum member 130, can be lubricated and cooled well. It is possible to make the automatic transmission 20 compact by applying the drum member 120 (the clutch hub and the clutch drum) discussed above to the clutches C1 and C2 which correspond to the third ring gear 23*r* (first output element) and the third sun gear 23*s* (second output element), respectively, of the Ravigneaux type planetary gear mechanism 25.

In the automatic transmission 20 discussed above, at least one of the clutches C1 to C4 and the brakes B1 and B2 may be a meshing engagement element such as a dog clutch or a dog brake. For example, in the automatic transmission 20, a dog brake may be adopted as the brake B2 which is engaged continuously to establish the first forward speed to the fourth forward speed and which is engaged to establish the reverse speed. In the automatic transmission 20, in addition, the gear ratios $\lambda 1$ to $\lambda 4$ used in the first and second planetary gears 21 and 22 and the Ravigneaux type planetary gear mechanism 25 are not limited to those described above. In the automatic transmission, further, at least one of the first and second planetary gears 21 and 22 may be a double-pinion planetary gear, and the Ravigneaux type planetary gear mechanism 25 may be replaced with a composite planetary gear train such as a Simpson type or a CR-CR type, for example. In addition, the automatic transmission 20 discussed above may be altered into a transmission to be mounted on a front-drive vehicle.

As has been described above, preferred embodiments provide a multi-speed transmission that transfers power, which has been transferred from a motor of a vehicle to an input member, to an output member with a speed of the power changed, the multi-speed transmission including: a Ravigneaux type planetary gear mechanism that has an input element, a fixable element, a first output element, and a second output element; a first planetary gear that has a plurality of rotary elements; a second planetary gear that has a plurality of rotary elements and that is disposed in proximity to the Ravigneaux type planetary gear mechanism with respect to the first planetary gear; a first brake that connects the fixable element of the Ravigneaux type planetary gear mechanism to a stationary member to hold the fixable element stationary such that the fixable element is unrotatable, and that disconnects the fixable element and the stationary member from each other; a first clutch that connects between the first output element of the Ravigneaux type planetary gear mechanism and at least one of the rotary elements of the first and second planetary gears, and that disconnects the first output element and the rotary element of the first and second planetary gears from each other; and a second clutch that connects between the second output element of the Ravigneaux type planetary gear mechanism and at least one of the rotary elements of the first and second planetary gears, and that disconnects the second output element and the rotary element of the first and second planetary gears from each other, wherein the Ravigneaux type planetary gear mechanism transfers the power, which has been transferred to the input element, to the first and second output elements with the speed of the power increased such that a rotational speed of the second output element is higher than a rotational speed of the first output element when the fixable element is held stationary by the first brake so as to be unrotatable; and the second clutch is disposed between the Ravigneaux type planetary gear mechanism and the second planetary gear in an axial direction of the input member.

That is, the multi-speed transmission transfers power, which has been transferred from the motor to the input member, to the output member with the speed of the power changed, and includes the Ravigneaux type planetary gear mechanism which transfers the power, which has been transferred to the input element, to the first and second output elements with the speed of the power increased such that the rotational speed of the second output element is higher than the rotational speed of the first output element when the fixable element is held stationary by the brake so as to be unrotatable. Further, the multi-speed transmission includes the second clutch which connects between the second output element of the Ravigneaux type planetary gear mechanism and at least one of the rotary elements of the first and second planetary gears, and that disconnects the second output element and the rotary element of the first and second planetary gears from each other, and the second clutch is disposed between the Ravigneaux type planetary gear mechanism and the second planetary gear which is disposed in proximity to the Ravigneaux type planetary gear mechanism with respect to the first planetary gear.

Thus, with the second clutch, which corresponds to the second output element of the Ravigneaux type planetary gear mechanism which rotates at a higher speed, disposed between the Ravigneaux type planetary gear mechanism and the second planetary gear which is disposed in proximity to the Ravigneaux type planetary gear mechanism, there is no need to configure the constituent members of the second clutch to bypass the planetary gears with a large diameter. Consequently, an increase in size of the multi-speed transmission can be suppressed by suppressing an increase in dimensions (such as outside diameter, axial length, and thickness), that is, weight, due to securing the strength of the constituent members of the second clutch. Further, it is possible to improve the speed change performance by reducing the inertia during rotation of the second output element, which rotates at a higher speed than that of the first output element, and members that rotate together with the second output element.

The second clutch may have a clutch hub always coupled to the second output element of the Ravigneaux type planetary gear mechanism, and a clutch drum always coupled to one of the rotary elements of the second planetary gear; and the clutch hub and the clutch drum of the second clutch may be disposed between the Ravigneaux type planetary gear mechanism and the second planetary gear in the axial direction. With the multi-speed transmission, there is no need to configure the clutch hub and the clutch drum of the second clutch to bypass the planetary gears with a large diameter. Thus, it is possible to suppress an increase in size of the multi-speed transmission by suppressing an increase in weight of the clutch hub and the clutch drum of the second clutch, and to reduce the inertia during rotation of the clutch hub and the clutch drum of the second clutch.

The second clutch may further have first and second friction engagement plates; and an outer peripheral portion of the first friction engagement plate may be fitted with the clutch drum, and an inner peripheral portion of the second friction engagement plate may be fitted with the clutch hub. That is, by coupling the clutch hub, which can be made smaller in diameter than the clutch drum, to the second output element, which rotates at a higher speed than that of the first output element, it is possible to further reduce the inertia during rotation of the clutch hub.

The first clutch may have a clutch drum always coupled to the first output element of the Ravigneaux type planetary gear mechanism, and a clutch hub always coupled to one of the rotary elements of the second planetary gear; and the clutch drum and the clutch hub of the first clutch may be disposed between the Ravigneaux type planetary gear mechanism and the second planetary gear in the axial direction. With the multi-speed transmission, there is no need to configure the clutch drum and the clutch hub of the first clutch to bypass the planetary gears with a large diameter. Thus, it is possible to suppress an increase in size of the multi-speed transmission by suppressing an increase in weight of the clutch drum and the clutch hub of the first clutch, and to reduce the inertia during rotation of the clutch drum and the clutch hub of the first clutch.

The clutch drum of the first clutch may be disposed so as to surround at least a part of the clutch hub and the clutch drum of the second clutch from a radially outer side. Consequently, it is possible to suppress an increase in axial length of the multi-speed transmission better.

The multi-speed transmission may further include a drum member that includes a hub portion that functions as the clutch hub of the first clutch, and a drum portion that functions as the clutch drum of the second clutch; and one of the rotary elements to be connected to the first output element of the Ravigneaux type planetary gear mechanism by the first clutch and one of the rotary elements to be connected to the second output element of the Ravigneaux type planetary gear mechanism by the second clutch may be the same as each other.

The Ravigneaux type planetary gear mechanism may have a short pinion gear, a long pinion gear that meshes with the short pinion gear, a carrier that rotatably supports the short pinion gear and the long pinion gear, a ring gear that meshes with the long pinion gear, a sun gear that meshes with the short pinion gear, and a sun gear that meshes with the long pinion gear; and the fixable element may be the sun gear which meshes with the long pinion gear, the input element may be the carrier, the first output element may be the ring gear, and the second output element may be the sun gear which meshes with the short pinion gear. Consequently, it is possible to make the rotational speed of the sun gear, which serves as the second output element, higher than that of the ring gear, which serves as the first output element, when the sun gear, which serves as a fixable element, is held stationary by the first brake so as to be unrotatable.

The multi-speed transmission may further include a second brake that connects one of the rotary elements of the second planetary gear to the stationary member to hold the rotary element stationary such that the rotary element is unrotatable, and that disconnects the rotary element and the stationary member from each other; and the clutch drum of the second clutch may be coupled to one of the rotary elements of the second planetary gear through a radially inner side of the second brake.

The multi-speed transmission may further include a third clutch and a fourth clutch; three of the first, second, third, and fourth clutches and the first and second brakes may be selectively engaged to establish a plurality of shift speeds; oil chambers of the first and third clutches may be disposed between the second clutch and the second planetary gear in the axial direction; and the fourth clutch may be disposed on a side opposite to the Ravigneaux type planetary gear mechanism with respect to the second planetary gear. Consequently, it is possible to provide the second clutch, which corresponds to the second output element which rotates at a higher speed than that of the first output element, in proximity to the Ravigneaux type planetary gear mechanism. As a result, it is possible to reduce the axial length, that is, the weight, of the constituent members of the second clutch, which rotate together with the second output element, which makes it possible to further improve the speed change performance by reducing the inertia during rotation of the constituent members of the second clutch. Additionally, it is possible to suppress an increase in axial length of the multi-speed transmission.

The first planetary gear may have a first sun gear, a first carrier, and a first ring gear; the second planetary gear may have a second sun gear, a second carrier, and a second ring gear; the first sun gear of the first planetary gear and the second sun gear of the second planetary gear may be always coupled to each other; the first carrier of the first planetary gear may be always coupled to the input member and the input element of the Ravigneaux type planetary gear mechanism; the second carrier of the second planetary gear may be always coupled to the output member; the first clutch may connect between the first output element of the Ravigneaux type planetary gear mechanism and the first and second sun gears which are always coupled to each other, and disconnect the first output element and the first and second sun gears from each other; the second clutch may connect between the second output element of the Ravigneaux type planetary gear mechanism and the first and second sun gears which are always coupled to each other, and disconnect the second output element and the first and second sun gears from each other; the third clutch may connect between the first output element of the Ravigneaux type planetary gear mechanism and the second ring gear of the second planetary gear, and disconnect the first output element and the second ring gear from each other; the fourth clutch may connect between the first ring gear of the first planetary gear and the second carrier of the second planetary gear, and disconnect the first ring gear and the second carrier from each other; and the second brake may connect the second ring gear of the second planetary gear to the stationary member to hold the second ring gear stationary such that the second ring gear is unrotatable, and disconnect the second ring gear and the stationary member from each other.

The multi-speed transmission according to such an aspect includes the Ravigneaux type planetary gear mechanism, the first and second planetary gears, the first to fourth clutches, and the first and second brakes. With the multi-speed transmission, the first to tenth forward speeds and the reverse speed can be established by selectively engaging three of the first to fourth clutches and the first and second brakes. As a result, with the multi-speed transmission, the power transfer efficiency, that is, the fuel efficiency and the acceleration performance of the vehicle, can be improved by further increasing the spread (gear ratio width=the gear ratio of the lowest shift speed/the gear ratio of the highest shift speed). Further, the step ratio (the gear ratio of a shift speed/the gear ratio of a certain shift speed one step higher) can be optimized (suppressed an increase) to improve the shifting feeling. Thus, with the multi-speed transmission, both the power transfer efficiency and the drivability can be improved well.

With the multi-speed transmission, further, as with the input element of the Ravigneaux type planetary gear mechanism, the first carrier of the first planetary gear is always coupled to the input member, and the first ring gear of the first planetary gear is selectively connected to the output member (and the second carrier of the second planetary gear) by the fourth clutch. Consequently, torque distribution to the fourth clutch can be reduced compared to a clutch that selectively connects between a first carrier and an input member in a transmission in which a first ring gear of a first planetary gear is always coupled to an output member together with a second carrier of a second planetary gear and the first carrier of the first planetary gear is selectively connected to the input member. As a result, the fourth clutch can be made compact in at least one of the axial direction and the radial direction. Thus, with the multi-speed transmission, it is possible to improve both the power transfer efficiency and the drivability, and to suppress an increase in size of the entire device.

With the multi-speed transmission, the first to tenth forward speeds and the reverse speed can be established by engaging the first to fourth clutches and the first and second brakes as follows. The first forward speed is established by engaging the first clutch, the second clutch, and the second brake. The second forward speed is established by engaging the first clutch, the first brake, and the second brake. The third forward speed is established by engaging the second clutch, the first brake, and the second brake. The fourth forward speed is established by engaging the fourth clutch, the first brake, and the second brake. The fifth forward speed is established by engaging the second clutch, the fourth clutch, and the first brake. The sixth forward speed is established by engaging the first clutch, the fourth clutch, and the first brake. The seventh forward speed is established by engaging the first clutch, the third clutch, and the fourth clutch. The eighth forward speed is established by engaging the third clutch, the fourth clutch, and the first brake. The ninth forward speed is established by engaging the first clutch, the third clutch, and the first brake. The tenth forward speed is established by engaging the second clutch, the third clutch, and the first brake. The reverse speed is established by engaging the second clutch, the third clutch, and the second brake.

Consequently, with the multi-speed transmission according to the aspect described above, each of the first forward speed to the tenth forward speed and the reverse speed is established by engaging three of the first to fourth clutches and the first and second brakes and disengaging the remaining three first to fourth clutches and the first and second brakes. Consequently, it is possible to reduce the number of engagement elements to be disengaged to establish a shift speed compared to a transmission in which a plurality of shift speeds are established by engaging two of six engagement elements and disengaging the remaining four engagement elements, for example. As a result, the power transfer efficiency of the multi-speed transmission can be further improved by reducing a drag loss in the engagement elements disengaged to establish a shift speed.

The output member may be an output shaft coupled to rear wheels of the vehicle via a differential gear. That is, the multi-speed transmission according to preferred embodiments may be constituted as a transmission to be mounted on a rear-drive vehicle. It should be noted, however, that the multi-speed transmission according to preferred embodiments may also be constituted as a transmission to be mounted on a front-drive vehicle as discussed above.

The present invention is not limited to the embodiment described above in any way, and it is a matter of course that the present invention may be modified in various ways without departing from the scope of the present invention. Further, the mode for carrying out the present invention described above is merely a specific form of the invention described in the "SUMMARY" section, and does not limit the elements of the invention described in the "SUMMARY" section.

The invention claimed is:

1. A multi-speed transmission that transfers power, which has been transferred from a motor of a vehicle to an input member, to an output member with a speed of the power changed, the multi-speed transmission comprising:
   a Ravigneaux planetary gear mechanism that has an input element, a fixable element, a first output element, and a second output element;
   a first planetary gear set that has a plurality of rotary elements;
   a second planetary gear set that has a plurality of rotary elements and that is disposed in proximity to the Ravigneaux planetary gear mechanism with respect to the first planetary gear set;
   a first brake that connects the fixable element of the Ravigneaux planetary gear mechanism to a stationary member to hold the fixable element stationary such that the fixable element is unrotatable, and that disconnects the fixable element and the stationary member from each other;
   a first clutch that connects between the first output element of the Ravigneaux planetary gear mechanism and at least one of the rotary elements of the first and second planetary gear sets, and that disconnects the first output element and the rotary element of the first and second planetary gear sets from each other; and
   a second clutch that connects between the second output element of the Ravigneaux planetary gear mechanism and at least one of the rotary elements of the first and second planetary gear sets, and that disconnects the second output element and the rotary element of the first and second planetary gear sets, from each other,
   wherein the Ravigneaux planetary gear mechanism transfers the power, which has been transferred to the input element, to the first and second output elements with the speed of the power increased such that a rotational speed of the second output element is higher than a rotational speed of the first output element when the fixable element is held stationary by the first brake so as to be unrotatable; and
   the second clutch is disposed between the Ravigneaux planetary gear mechanism and the second planetary gear set in an axial direction of the input member.

2. The multi-speed transmission according to claim 1, wherein
   the second clutch has a clutch hub always coupled to the second output element of the Ravigneaux planetary gear mechanism, and a clutch drum always coupled to one of the rotary elements of the second planetary gear set; and
   the clutch hub and the clutch drum of the second clutch are disposed between the Ravigneaux planetary gear mechanism and the second planetary gear set in the axial direction.

3. The multi-speed transmission according to claim 2, wherein
   the second clutch further has first and second friction engagement plates; and
   an outer peripheral portion of the first friction engagement plate is fitted with the clutch drum, and an inner peripheral portion of the second friction engagement plate is fitted with the clutch hub.

4. The multi-speed transmission according to claim 3, wherein
   the first clutch has a clutch drum always coupled to the first output element of the Ravigneaux planetary gear mechanism, and a clutch hub always coupled to one of the rotary elements of the second planetary gear set; and
   the clutch drum and the clutch hub of the first clutch are disposed between the Ravigneaux planetary gear mechanism and the second planetary gear set in the axial direction.

5. The multi-speed transmission according to claim 4, wherein
   the clutch drum of the first clutch is disposed so as to surround at least a part of the clutch hub and the clutch drum of the second clutch from a radially outer side.

6. The multi-speed transmission according to claim 5, further comprising
   a drum member that includes a hub portion that functions as the clutch hub of the first clutch, and a drum portion that functions as the clutch drum of the second clutch, wherein
   one of the rotary elements to be connected to the first output element of the Ravigneaux planetary gear mechanism by the first clutch and one of the rotary elements to be connected to the second output element of the Ravigneaux planetary gear mechanism by the second clutch are the same as each other.

7. The multi-speed transmission according to claim 6, wherein
the Ravigneaux planetary gear mechanism has a short pinion gear, a long pinion gear that meshes with the short pinion gear, a carrier that rotatably supports the short pinion gear and the long pinion gear, a ring gear that meshes with the long pinion gear, a sun gear that meshes with the short pinion gear, and a sun gear that meshes with the long pinion gear; and
the fixable element is the sun gear which meshes with the long pinion gear, the input element is the carrier, the first output element is the ring gear, and the second output element is the sun gear which meshes with the short pinion gear.

8. The multi-speed transmission according to claim 7, further comprising
a second brake that connects one of the rotary elements of the second planetary gear set to the stationary member to hold the rotary element stationary such that the rotary element is unrotatable, and that disconnects the rotary element and the stationary member from each other, wherein
the clutch drum of the second clutch is coupled to one of the rotary elements of the second planetary gear set through a radially inner side of the second brake.

9. The multi-speed transmission according to claim 8, further comprising
a third clutch and a fourth clutch, wherein
three of the first, second, third, and fourth clutches and the first and second brakes are selectively engaged to establish a plurality of shift speeds;
oil chambers of the first and third clutches are disposed between the second clutch and the second planetary gear set in the axial direction; and
the fourth clutch is disposed on a side opposite to the Ravigneaux planetary gear mechanism with respect to the second planetary gear set.

10. The multi-speed transmission according to claim 9, wherein
the first planetary gear set has a first sun gear, a first carrier, and a first ring gear;
the second planetary gear set has a second sun gear, a second carrier, and a second ring gear;
the first sun gear of the first planetary gear set and the second sun gear of the second planetary gear set are always coupled to each other;
the first carrier of the first planetary gear set is always coupled to the input member and the input element of the Ravigneaux planetary gear mechanism;
the second carrier of the second planetary gear set is always coupled to the output member;
the first clutch connects between the first output element of the Ravigneaux planetary gear mechanism and the first and second sun gears which are always coupled to each other, and disconnects the first output element and the first and second sun gears from each other;
the second clutch connects between the second output element of the Ravigneaux planetary gear mechanism and the first and second sun gears which are always coupled to each other, and disconnects the second output element and the first and second sun gears from each other;
the third clutch connects between the first output element of the Ravigneaux planetary gear mechanism and the second ring gear of the second planetary gear set, and disconnects the first output element and the second ring gear from each other;
the fourth clutch connects between the first ring gear of the first planetary gear set and the second carrier of the second planetary gear set, and disconnects the first ring gear and the second carrier from each other; and
the second brake connects the second ring gear of the second planetary gear set to the stationary member to hold the second ring gear stationary such that the second ring gear is unrotatable, and disconnects the second ring gear and the stationary member from each other.

11. The multi-speed transmission according to claim 10, wherein
a first forward speed is established by engaging the first clutch, the second clutch, and the second brake;
a second forward speed is established by engaging the first clutch, the first brake, and the second brake;
a third forward speed is established by engaging the second clutch, the first brake, and the second brake;
a fourth forward speed is established by engaging the fourth clutch, the first brake, and the second brake;
a fifth forward speed is established by engaging the second clutch, the fourth clutch, and the first brake;
a sixth forward speed is established by engaging the first clutch, the fourth clutch, and the first brake;
a seventh forward speed is established by engaging the first clutch, the third clutch, and the fourth clutch;
an eighth forward speed is established by engaging the third clutch, the fourth clutch, and the first brake;
a ninth forward speed is established by engaging the first clutch, the third clutch, and the first brake;
a tenth forward speed is established by engaging the second clutch, the third clutch, and the first brake; and
a reverse speed is established by engaging the second clutch, the third clutch, and the second brake.

12. The multi-speed transmission according to claim 11, wherein
the output member is an output shaft coupled to rear wheels of the vehicle via a differential gear.

13. The multi-speed transmission according to claim 2, wherein
the first clutch has a clutch drum always coupled to the first output element of the Ravigneaux planetary gear mechanism, and a clutch hub always coupled to one of the rotary elements of the second planetary gear set; and
the clutch drum and the clutch hub of the first clutch are disposed between the Ravigneaux planetary gear mechanism and the second planetary gear set in the axial direction.

14. The multi-speed transmission according to claim 13, wherein
the clutch drum of the first clutch is disposed so as to surround at least a part of the clutch hub and the clutch drum of the second clutch from a radially outer side.

15. The multi-speed transmission according to claim 14, further comprising
a drum member that includes a hub portion that functions as the clutch hub of the first clutch, and a drum portion that functions as the clutch drum of the second clutch, wherein
one of the rotary elements to be connected to the first output element of the Ravigneaux planetary gear mechanism by the first clutch and one of the rotary elements to be connected to the second output element of the Ravigneaux planetary gear mechanism by the second clutch are the same as each other.

16. The multi-speed transmission according to claim 15, wherein the Ravigneaux planetary gear mechanism has a short pinion gear, a long pinion gear that meshes with the short pinion gear, a carrier that rotatably supports the short pinion gear and the long pinion gear, a ring gear that meshes with the long pinion gear, a sun gear that meshes with the short pinion gear, and a sun gear that meshes with the long pinion gear; and the fixable element is the sun gear which meshes with the long pinion gear, the input element is the carrier, the first output element is the ring gear, and the second output element is the sun gear which meshes with the short pinion gear.

17. The multi-speed transmission according to claim 13, further comprising a drum member that includes a hub portion that functions as the clutch hub of the first clutch, and a drum portion that functions as the clutch drum of the second clutch, wherein one of the rotary elements to be connected to the first output element of the Ravigneaux planetary gear mechanism by the first clutch and one of the rotary elements to be connected to the second output element of the Ravigneaux planetary gear mechanism by the second clutch are the same as each other.

18. The multi-speed transmission according to claim 14, wherein the Ravigneaux planetary gear mechanism has a short pinion gear, a long pinion gear that meshes with the short pinion gear, a carrier that rotatably supports the short pinion gear and the long pinion gear, a ring gear that meshes with the long pinion gear, a sun gear that meshes with the short pinion gear, and a sun gear that meshes with the long pinion gear; and the fixable element is the sun gear which meshes with the long pinion gear, the input element is the carrier, the first output element is the ring gear, and the second output element is the sun gear which meshes with the short pinion gear.

\* \* \* \* \*